(12) United States Patent
Scales et al.

(10) Patent No.: US 7,783,779 B1
(45) Date of Patent: Aug. 24, 2010

(54) STORAGE MULTIPATH MANAGEMENT IN A VIRTUAL COMPUTER SYSTEM

(75) Inventors: Daniel J. Scales, Mountain View, CA (US); Thorbioern Donbaek Jensen, Mountain View, CA (US)

(73) Assignee: VMware, Inc, Palo Alto, CA (US)

( * ) Notice: Subject to any disclaimer, the term of this patent is extended or adjusted under 35 U.S.C. 154(b) by 1055 days.

(21) Appl. No.: 10/665,779

(22) Filed: Sep. 19, 2003

(51) Int. Cl.
*G06F 15/173* (2006.01)
(52) U.S. Cl. .................. 709/240; 709/207; 709/217; 709/226; 709/229; 709/238; 718/1; 718/103; 718/104
(58) Field of Classification Search ............ 709/207, 709/216, 223, 229, 238, 240; 718/1, 100, 718/103, 104
See application file for complete search history.

(56) References Cited

U.S. PATENT DOCUMENTS

| | | | | |
|---|---|---|---|---|
| 4,396,984 | A | * | 8/1983 | Videki, II ................ 710/38 |
| 4,742,447 | A | * | 5/1988 | Duvall et al. .............. 718/1 |
| 4,916,608 | A | * | 4/1990 | Shultz .................... 718/104 |
| 5,257,386 | A | * | 10/1993 | Saito ..................... 712/225 |
| 5,361,375 | A | * | 11/1994 | Ogi ....................... 718/1 |
| 5,572,694 | A | * | 11/1996 | Uchino .................... 718/1 |
| 5,692,193 | A | * | 11/1997 | Jagannathan et al. ....... 718/106 |
| 6,453,392 | B1 | * | 9/2002 | Flynn, Jr. ................ 711/151 |
| 6,601,081 | B1 | * | 7/2003 | Provino et al. ............ 718/1 |
| 6,970,913 | B1 | * | 11/2005 | Albert et al. ............. 709/217 |
| 7,093,086 | B1 | * | 8/2006 | van Rietschote .......... 711/161 |
| 7,203,944 | B1 | * | 4/2007 | van Rietschote et al. ... 718/104 |
| 7,213,246 | B1 | * | 5/2007 | van Rietschote et al. ... 718/1 |
| 7,296,267 | B2 | * | 11/2007 | Cota-Robles et al. ...... 718/1 |
| 7,415,708 | B2 | * | 8/2008 | Knauerhase et al. ....... 718/1 |
| 2004/0025166 | A1 | * | 2/2004 | Adlung et al. ............ 719/310 |

* cited by examiner

*Primary Examiner*—Dohm Chankong
(74) *Attorney, Agent, or Firm*—Darryl A. Smith

(57) ABSTRACT

A virtual computer system, including one or more virtual machines (VMs), is connected to a redundant data storage system having multiple paths for routing data between the computer system and the data storage system. The VMs are supported by a kernel, which includes a resource manager for allocating system resources among the VMs, including data storage space and data storage bandwidth. A storage path manager (SPM) is integrated into the kernel for routing data between the computer system and the data storage system, including providing functions such as failovers and failbacks, as well as load distribution. Integrating the SPM into the kernel improves the kernel's ability to manage the VMs and to provide SAN resources to the VMs. For example, the SPM may enhance the isolation between multiple VMs by routing their respective data over different data paths. Also, the SPM may improve the allocation of system resources by coordinating with the resource manager.

26 Claims, 7 Drawing Sheets

STORAGE MULTIPATH MANAGEMENT IN A VIRTUAL COMPUTER SYSTEM

BACKGROUND OF THE INVENTION

1. Field of the Invention

This invention relates to virtualized computer systems, and, in particular, to a system and method for routing data over multiple paths between a virtual computer system and a data storage system.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete," isolated computer. In addition, the advantages of storage area networks and other redundant, multipath data storage systems have become widely recognized. These advantages include higher availability and better use of storage resources. This invention involves an improved system and method for combining virtual machine technology with multipath storage technologies to enhance the advantages of each of these technologies.

General Virtualized Computer System

As is well known in the field of computer science, a virtual machine (VM) is a software abstraction—a "virtualization"—of an actual physical computer system. FIG. 1 illustrates, in part, the general configuration of a virtual computer system 700A, including a virtual machine 200, which is installed as a "guest" on a "host" hardware platform 100.

As FIG. 1 shows, the hardware platform 100 includes one or more processors (CPUs) 110, system memory 130, and one or more local and/or remote storage devices, which will typically include a local disk 140. The system memory will typically be some form of high-speed RAM, whereas the disk (one or more) will typically be a non-volatile, mass storage device. The hardware 100 will also include other conventional mechanisms such as a memory management unit MMU 150 and various registers 160.

Each VM 200 will typically include at least one virtual CPU 210, at least one virtual disk 240, a virtual system memory 230, a guest operating system 220 (which may simply be a copy of a conventional operating system), and various virtual devices 270, in which case the guest operating system ("guest OS") will include corresponding drivers 224. All of the components of the VM may be implemented in software using known techniques to emulate the corresponding components of an actual computer.

If the VM is properly designed, then it will not be apparent to the user that any applications 260 running within the VM are running indirectly, that is, via the guest OS and virtual processor. Applications 260 running within the VM will act just as they would if run on a "real" computer, except for a decrease in running speed that will be noticeable only in exceptionally time-critical applications. Executable files will be accessed by the guest OS from a virtual disk or virtual memory, which may simply be portions of an actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is usually required between a VM and the underlying host platform (in particular, the CPU), which is responsible for actually executing VM-issued instructions and transferring data to and from the actual memory and storage devices. A common term for this interface is a "virtual machine monitor" (VMM), shown as component 300. A VMM is usually a thin piece of software that runs directly on top of a host, or directly on the hardware, and virtualizes the resources of the physical host machine. Among other components, the VMM therefore usually includes device emulators 330, which may constitute the virtual devices 270 that the VM 200 accesses. The interface exported to the VM is then the same as the hardware interface of the machine, so that the guest OS cannot determine the presence of the VMM.

The VMM also usually tracks and either forwards (to some form of operating system) or itself schedules and handles all requests by its VM for machine resources, as well as various faults and interrupts. A mechanism known in the art as an exception or interrupt handler 355 is therefore included in the VMM. As is well known, such an interrupt/exception handler normally includes an interrupt descriptor table (IDT), or some similar table, which is typically a data structure that uses information in the interrupt signal to point to an entry address for a set of instructions that are to be executed when the interrupt/exception occurs.

Although the VM (and thus the user of applications running in the VM) cannot usually detect the presence of the VMM, the VMM and the VM may be viewed as together forming a single virtual computer. They are shown in FIG. 1 as separate components for the sake of clarity.

Moreover, the various virtualized hardware components such as the virtual CPU(s) 210, the virtual memory 230, the virtual disk 240, and the virtual device(s) 270 are shown as being part of the VM 200 for the sake of conceptual simplicity—in actual implementations these "components" are usually constructs or emulations exported to the VM by the VMM. For example, the virtual disk 240 is shown as being within the VM 200. This virtual component, which could alternatively be included among the virtual devices 270, may in fact be implemented as one of the device emulators 330 in the VMM.

The device emulators 330 emulate the system resources for use within the VM. These device emulators will then typically also handle any necessary conversions between the resources as exported to the VM and the actual physical resources. One advantage of such an arrangement is that the VMM may be set up to expose "generic" devices, which facilitate VM migration and hardware platform-independence. For example, the VMM may be set up with a device emulator 330 that emulates a standard Small Computer System Interface (SCSI) disk, so that the virtual disk 240 appears to the VM 200 to be a standard SCSI disk connected to a standard SCSI adapter, whereas the underlying, actual, physical disk 140 may be something else. In this case, a standard SCSI driver is installed into the guest OS 220 as one of the drivers 224. The device emulator 330 then interfaces with the driver 224 and handles disk operations for the VM 200. The device emulator 330 then converts the disk operations from the VM 200 to corresponding disk operations for the physical disk 140.

Virtual and Physical Memory

As in most modern computers, the address space of the memory 130 is partitioned into pages (for example, in the Intel x86 architecture) or other analogous units. Applications then address the memory 130 using virtual addresses (VAs), which include virtual page numbers (VPNs). The VAs are then mapped to physical addresses (PAs) that are used to address the physical memory 130. (VAs and PAs have a common offset from a base address, so that only the VPN needs to be converted into a corresponding physical page number (PPN).) The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in other architectures where relocatability is possible.

An extra level of addressing indirection is typically implemented in virtualized systems in that a VPN issued by an application 260 in the VM 200 is remapped twice in order to determine which page of the hardware memory is intended. The first mapping is provided by a mapping module within the guest OS 220, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory must ultimately be generated. A memory management module 350, located typically in the VMM 300, therefore performs the second mapping by taking the GPPN issued by the guest OS 220 and mapping it to a hardware (or "machine") page number PPN that can be used to address the hardware memory 130. This GPPN-to-PPN mapping may instead be done in the main system-level software layer (such as in a mapping module in a kernel 600A, which is described below), depending on the implementation. From the perspective of the guest OS, the GVPN and GPPN might be virtual and physical page numbers just as they would be if the guest OS were the only OS in the system. From the perspective of the system software, however, the GPPN is a page number that is then mapped into the physical memory space of the hardware memory as a PPN.

System Software Configurations in Virtualized Systems

In some systems, such as the Workstation product of VMware, Inc., of Palo Alto, Calif., the VMM is co-resident at system level with a host operating system. Both the VMM and the host OS can independently modify the state of the host processor, but the VMM calls into the host OS via a driver and a dedicated user-level application to have the host OS perform certain I/O operations on behalf of the VM. The virtual computer in this configuration is thus fully hosted in that it runs on an existing host hardware platform and together with an existing host OS.

In other implementations, a dedicated kernel takes the place of and performs the conventional functions of the host OS, and virtual computers run on the kernel. FIG. 1 illustrates a kernel 600A that serves as the system software for several VM/VMM pairs 200/300, . . . , 200N/300N. Compared with a system in which VMMs run directly on the hardware platform, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of VMMs. The ESX Server product of VMware, Inc., has such a configuration. The invention described below takes advantage of the ability to optimize a kernel as a platform for virtual computers.

A kernel-based virtualization system of the type illustrated in FIG. 1 is described in U.S. patent application Ser. No. 09/877,378 ("Computer Configuration for Resource Management in Systems Including a Virtual Machine"), which is incorporated here by reference. The main components of this system and aspects of their interaction are, however, outlined below.

At boot-up time, an existing operating system 420 may be at system level and the kernel 600A may not yet even be operational within the system. In such case, one of the functions of the OS 420 may be to make it possible to load the kernel 600A, after which the kernel runs on the native hardware 100 and manages system resources. In effect, the kernel, once loaded, displaces the OS 420. Thus, the kernel 600A may be viewed either as displacing the OS 420 from the system level and taking this place itself, or as residing at a "sub-system level." When interposed between the OS 420 and the hardware 100, the kernel 600A essentially turns the OS 420 into an "application," which has access to system resources only when allowed by the kernel 600A. The kernel then schedules the OS 420 as if it were any other component that needs to use system resources.

The OS 420 may also be included to allow applications unrelated to virtualization to run; for example, a system administrator may need such applications to monitor the hardware 100 or to perform other administrative routines. The OS 420 may thus be viewed as a "console" OS (COS). In such implementations, the kernel 600A preferably also includes a remote procedure call (RPC) mechanism to enable communication between, for example, the VMM 300 and any applications 430 installed to run on the COS 420.

Actions

In kernel-based systems such as the one illustrated in FIG. 1, there must be some way for the kernel 600A to communicate with the VMM 300. In general, the VMM 300 can call into the kernel 600A but the kernel cannot call directly into the VMM. The conventional technique for overcoming this is for the kernel to post "actions" (requests for the VMM to do something) on an action queue stored in memory 130. As part of the VMM code, the VMM looks at this queue periodically, and always after it returns from a kernel call and also before it resumes a VM. One typical action is the "raise interrupt" action: If the VMM sees this action it will raise an interrupt to the VM 200 in the conventional manner.

As is known, for example, from U.S. Pat. No. 6,397,242 (Devine, et al., 28 May 2002), some virtualization systems allow VM instructions to run directly (in "direct execution") on the hardware CPU(s) when possible. When necessary, however, VM execution is switched to the technique known as "binary translation," during which the VM is running in the VMM. In any systems where the VM is running in direct execution when it becomes necessary for the VMM to check actions, the kernel must interrupt the VMM so that it will stop executing VM instructions and check its action queue. This may be done using known programming techniques.

Worlds

The kernel 600A handles not only the various VMM/VMs, but also any other applications running on the kernel, as well as the COS 420 and even the hardware CPU(s) 110, as entities that can be separately scheduled. In this disclosure, each schedulable entity is referred to as a "world," which contains a thread of control, an address space, machine memory, and handles to the various device objects that it is accessing. Worlds are stored in a portion of the memory space controlled by the kernel. More specifically, the worlds are controlled by a world manager, represented in FIG. 1 within the kernel 600A as module 612. Each world also has its own task structure, and usually also a data structure for storing the hardware state currently associated with the respective world.

There will usually be different types of worlds: 1) system worlds, which are used for idle worlds, one per CPU, and a helper world that performs tasks that need to be done asynchronously; 2) a console world, which is a special world that runs in the kernel and is associated with the COS 420; and 3) virtual machine worlds.

Worlds preferably run at the most-privileged level (for example, in a system with the Intel x86 architecture, this will be level CPL0), that is, with full rights to invoke any privileged CPU operations. A VMM, which, along with its VM, constitutes a separate world, therefore may use these privileged instructions to allow it to run its associated VM so that it performs just like a corresponding "real" computer, even with respect to privileged operations.

Switching Worlds

When the world that is running on a particular CPU (which may be the only one) is preempted by or yields to another world, then a world switch has to occur. A world switch involves saving the context of the current world and restoring the context of the new world such that the new world can begin executing where it left off the last time that it was running.

The first part of the world switch procedure that is carried out by the kernel is that the current world's state is saved in a data structure that is stored in the kernel's data area. Assuming the common case of an underlying Intel x86 architecture, the state that is saved will typically include: 1) the exception flags register; 2) general purpose registers; 3) segment registers; 4) the instruction pointer (EIP) register; 5) the local descriptor table register; 6) the task register; 7) debug registers; 8) control registers; 9) the interrupt descriptor table register; 10) the global descriptor table register; and 11) the floating point state. Similar state information will need to be saved in systems with other hardware architectures.

After the state of the current world is saved, the state of the new world can be restored. During the process of restoring the new world's state, no exceptions are allowed to take place because, if they did, the state of the new world would be inconsistent upon restoration of the state. The same state that was saved is therefore restored. The last step in the world switch procedure is restoring the new world's code segment and instruction pointer (EIP) registers.

When worlds are initially created, the saved state area for the world is initialized to contain the proper information such that when the system switches to that world, then enough of its state is restored to enable the world to start running. The EIP is therefore set to the address of a special world start function. Thus, when a running world switches to a new world that has never run before, the act of restoring the EIP register will cause the world to begin executing in the world start function.

Switching from and to the COS world requires additional steps, which are described in U.S. patent application Ser. No. 09/877,378, mentioned above. Understanding the details of this process is not necessary for understanding the present invention, however, so further discussion is omitted.

Memory Management in Kernel-Based System

The kernel 600A includes a memory management module 616 that manages all machine memory that is not allocated exclusively to the COS 420. When the kernel 600A is loaded, the information about the maximum amount of memory available on the machine is available to the kernel, as well as information about how much of it is being used by the COS. Part of the machine memory is used for the kernel 600A itself and the rest is used for the virtual machine worlds.

Virtual machine worlds use machine memory for two purposes. First, memory is used to back portions of each world's memory region, that is, to store code, data, stacks, etc., in the VMM page table. For example, the code and data for the VMM 300 is backed by machine memory allocated by the kernel 600A. Second, memory is used for the guest memory of the virtual machine. The memory management module may include any algorithms for dynamically allocating memory among the different VM's 200.

Interrupt and Exception Handling in Kernel-Based Systems

Interrupt and exception handling is related to the concept of "worlds" described above. As mentioned above, one aspect of switching worlds is changing various descriptor tables. One of the descriptor tables that is loaded when a new world is to be run is the new world's IDT. The kernel 600A therefore preferably also includes an interrupt/exception handler 655 that is able to intercept and handle (using a corresponding IDT in the conventional manner) interrupts and exceptions for all devices on the machine. When the VMM world is running, whichever IDT was previously loaded is replaced by the VMM's IDT, such that the VMM will handle all interrupts and exceptions.

The VMM will handle some interrupts and exceptions completely on its own. For other interrupts/exceptions, it will be either necessary or at least more efficient for the VMM to call the kernel to have the kernel either handle the interrupts/exceptions itself, or to forward them to some other sub-system such as the COS. One example of an interrupt that the VMM can handle completely on its own, with no call to the kernel, is a check-action IPI (inter-processor interrupt). One example of when the VMM preferably calls the kernel, which then forwards an interrupt to the COS, would be where the interrupt involves devices such as a mouse, which is typically controlled by the COS. The VMM may forward still other interrupts to the VM.

Device Access in Kernel-Based System

In the preferred embodiment of the invention, the kernel 600A is responsible for providing access to all devices on the physical machine. In addition to other modules that the designer may choose to load onto the system for access by the kernel, the kernel will therefore typically load conventional drivers as needed to control access to devices. Accordingly, FIG. 1 shows a module 610A containing loadable kernel modules and drivers. The kernel 600A may interface with the loadable modules and drivers in a conventional manner, using an application program interface (API) or similar interface.

Redundant, Multipath Data Storage Systems

This invention is particularly advantageous in relation to server computer systems, although it is not limited to such systems. Servers, by their very nature, generally require access to large amounts of data. For example, web servers, database servers and email servers all typically require access to large data stores. Various types of data storage devices and systems may be used to satisfy this requirement. For example, a server may be connected to a RAID (redundant array of inexpensive disks) storage unit (or disk array), a JBOD (just a bunch of disks) storage unit or a tape storage unit, to name a few. Storage systems may also comprise a combination of multiple types of storage devices, such as a RAID storage unit combined with a tape storage unit. Large data storage systems generally also include one or more storage processors, which coordinate writing data to the storage units and reading data from the storage units.

There are also various different interface mechanisms for connecting storage systems to servers, including everything from a simple SCSI interface to a complex Fibre Channel network. Also, it is often advantageous to connect multiple data storage systems to a single storage network, and/or to give multiple servers access to the same one or more data storage systems on a network. All of these various combinations of servers, data storage units and systems, and interface technologies are well known to a person of skill in the art and they are thoroughly described in existing literature. These various combinations, and others, can be used in a wide variety of different embodiments of this invention.

It is also advantageous to provide redundancy in connection with a server's access to its data store. A RAID storage unit has built in redundancy, as is well known in the art. Also, multiple storage processors may be provided that can each provide access to a server's data store, so that, if one processor fails, the other can still provide access. Also, multiple interfaces can be provided between a server and its data store, so that a second interface may be used if a first interface fails, such as multiple SCSI adapters for a direct-attached SCSI storage system, or a multipath Fibre Channel network. This invention may be used with any such multipath data storage system.

Each of these aspects of data storage systems provides different advantages to the overall server system. For example, providing storage units that use different media or technologies can lead to cost savings and efficiency in accessing data. RAID units and JBOD units can be used for data for which quick access is required, while tape units can be used for other data. Also, RAID units can be used instead of JBOD units for data that is relatively more important. Also, giving multiple servers shared access to one or more data storage systems can lead to better use of the storage resources. Otherwise, if each server had its own separate data storage system, surplus storage capacity that is not being used by one server could not readily be used by another server. Finally, providing redundant storage systems and multiple methods for accessing the storage systems can lead to a highly available data store. If one means for accessing a data store fails, communication can be switched over to another means for accessing the data.

One example of a redundant, multipath data storage system is illustrated in FIG. 2. FIG. 2 shows a first server 10A and a second server 10B connected to a storage area network (SAN) 22. The servers 10A and 10B may be any type of server, such as a conventional server based on the Intel IA-32 architecture and running a Linux OS, and may fulfill any of numerous different functions, such as implementing a web server, an email server or a database server. The SAN 22 may be any of a wide variety of SANs, which are well known.

In this example, the SAN 22 comprises a plurality of data storage units 18, specifically a first data storage unit 18A and a second data storage unit 18B. The storage units may be any type of storage unit or any combination of different types of storage units, including, for example, RAID storage units, JBOD storage units and tape storage units. The first storage unit 18A is controlled by a first storage processor 16A and a second storage processor 16B, while the second storage unit 18B is controlled by a third storage processor 16C and a fourth storage processor 16D, which may be any storage processors, including conventional storage processors. The first storage processor 16A is connected to the first storage unit 18A in a conventional manner by a first interface 27A, the second storage processor 16B is connected to the first storage unit 18A in a conventional manner by a second interface 27B, the third storage processor 16C is connected to the second storage unit 18B in a conventional manner by a third interface 29A, and the fourth storage processor 16D is connected to the second storage unit 18B in a conventional manner by a fourth interface 29B. The storage units 18, combined with the storage processors 16A, 16B, 16C and 16D, constitute a storage system 20.

The storage system 20 is connected to the servers 10A and 10B by a multipath data storage network. In the example of FIG. 2, the multipath data storage network is shown as a Fibre Channel network, which could be any Fibre Channel network. The multipath data storage network could, however, be any other type of multipath data storage network, such as a multipath SCSI or iSCSI (Internet SCSI) network. The first server 10A includes a first host bus adapter (HBA) 12A and a second HBA 12B for connecting to the Fibre Channel network, while the second server 10B includes a third HBA 12C and a fourth HBA 12D for connecting to the Fibre Channel network. The Fibre Channel network includes a first Fibre Channel switch 14A and a second Fibre Channel switch 14B. The Fibre Channel switches 14A and 14B may be any such switches, according to the specifications of the Fibre Channel Industry Association (FCIA). The first HBA 12A is connected to the first Fibre Channel switch 14A by a first interface 11, while the second HBA 12B is connected to the second Fibre Channel switch 14B by a second interface 13. The third HBA 12C is connected to the first Fibre Channel switch 14A by a third interface 15, while the fourth HBA 12D is connected to the second Fibre Channel switch 14B by a fourth interface 17. The interfaces 11, 13, 15 and 17 may be, for example, a Fibre Channel cable connected to a gigabit interface converter (GBIC), as is commonly used. The first Fibre Channel switch 14A is connected to the first storage processor 16A by a first interface 19 and to the third storage processor 16C by a second interface 21. The second Fibre Channel switch 14B is connected to the second storage processor 16B by a third interface 23 and to the fourth storage processor 16D by a fourth interface 25. The interfaces 11, 13, 15, 17, 19, 21, 23 and 25 are standard Fibre Channel interfaces as specified by the FCIA.

The SAN 22 may be considered to include the storage system 20, the Fibre Channel switches 14A and 14B, and the interfaces 19, 21, 23 and 25, as illustrated in FIG. 2, or the SAN 22 may be considered to additionally include the interfaces 11, 13, 15 and 17, and possibly the servers 10A and 10B. For this description, the SAN 22 will be described in the terms illustrated in FIG. 2. Various different SANs, such as the SAN 22, are well known in the art and are described in numerous existing documents. A person of skill in the art will understand the operation of SANs, and will be able to design and implement different SAN configurations, depending on particular storage system requirements.

Much of the redundancy of the server and data storage network of FIG. 2 is readily apparent. The first server 10A may access the storage units 18 through the HBAs 12A and 12B, the interfaces or data paths 11 and 13, the Fibre Channel switches 14A and 14B, the data paths 19, 21, 23, and 25, the storage processors 16A, 16B, 16C and 16D and the data paths 27A, 27B, 29A and 29B. Similarly, the second server 10B may access the storage units 18 through the HBAs 12C and 12D, the interfaces or data paths 15 and 17, the Fibre Channel switches 14A and 14B, the data paths 19, 21, 23, and 25, the storage processors 16A, 16B, 16C and 16D and the data paths 27A, 27B, 29A and 29B. For example, the first server may access the storage unit 18A through the HBA 12A, the data path 11, the Fibre Channel switch 14A, the data path 19, the storage processor 16A and the data path 27A, while the second server may access the storage unit 18B through the HBA 12C, the data path 15, the Fibre Channel switch 14A, the data path 21, the storage processor 16C and the data path 29A.

The paths by which the servers 10A and 10B access the storage units 18 may vary too. In particular, different paths may be selected for use, depending on operating conditions within the network. For example, suppose that the first server 10A is accessing the storage unit 18A through a first path comprising the HBA 12A, the data path 11, the Fibre Channel switch 14A, the data path 19, the storage processor 16A and the data path 27A. Suppose further that the HBA 12A has a failure that prevents the HBA's use by the server 10A. This failure may be detected, and data may be rerouted between the server 10A and the storage unit 18A along a second data path, such as through the HBA 12B, the data path 13, the Fibre Channel switch 14B, the data path 23, the storage processor 16B and the data path 27B. Switching the data path by which data is routed between a server and the storage units in response to a failure in the network is referred to as a "failover." Suppose further that the failing HBA is replaced with a new HBA, and data is again routed through the first data path. Rerouting data to the first path after correcting for a failure is referred to as a "failback."

As is well known in the art, the Fibre Channel specifications provide mechanisms for the automatic detection of network failures, the automatic reporting of network failures to other network components, and the automatic detection and reporting of the correction of network failures. Network failures and the correction of network failures are reported to servers and storage units, enabling the servers and storage units to perform automatic failovers and automatic failbacks. Thus, in the example described above, when the HBA 12A fails, the server 10A may automatically detect the failure and it may automatically failover to the second data path described above. After the failure is corrected, the server 10A may automatically detect that the HBA is functioning properly again and it may failback to the first data path again. A person of skill in the art will know how to design and implement a SAN that performs all of these functions.

In addition to selecting between alternate paths for data routing, multiple paths may also be used at the same time for routing data between a server and the storage units. For example, the server 10A may route some data through the first data path described above and other data through the second data path described above to obtain better overall data throughput. Distributing data between multiple data paths in this manner is referred to herein as "load distribution."

A software routine that selects paths by which data will be routed in a multipath data network, either for purposes of failovers and failbacks or for load distribution, or both, will be referred to as a storage path manager (SPM) herein. In the network of FIG. 2, the servers 10A and 10B, as well as the storage processors 16A, 16B, 16C and 16D may include SPMs. Such SPMs are known in the art, and various versions are available for purchase. This invention relates to a new implementation of an SPM at the server side, or host side, of data storage networks. The StorageWorks Secure Path software product from Hewlett-Packard Company and the PowerPath software product from EMC Corporation are examples of existing SPMs that operate from the server side of data storage networks.

Storage Path Managers

FIG. 3 illustrates the same server and data network as FIG. 2, but with a more detailed illustration of the servers 10A and 10B, instead of the SAN 22. FIG. 3 shows the servers 10A and 10B connected to the SAN 22 by the data paths 11, 13, 15 and 17. The first server 10A includes system hardware 30A, a set of drivers 34A, an operating system (OS) 32A and a set of applications 36A, while the second server 10B includes system hardware 30B, a set of drivers 34B, an OS 32B and a set of applications 36B, all of which may be conventional for the servers 10A and 10B. The system hardware 30A includes the HBA 12A and the HBA 12B, while the system hardware 30B includes the HBA 12C and the HBA 12D. The first server 10A includes a first SPM 38A that is implemented in a driver, which includes the functionality of a basic driver for the HBAs 12A and 12B. The second server 10B includes a second SPM 38B that is implemented within the OS 32B. The second server 10B also includes a separate HBA driver 37 for use with the HBAs 12C and 12D, which may be a basic HBA driver from QLogic Corporation or Emulex Corporation, for example.

The SPM 38A may be a SANblade Manager driver from QLogic Corporation, for example. The SANblade Manager driver provides the automatic failover capability described above, along with a load balancing function and a logical unit number (LUN) masking function. As is well known in the art, data storage units, such as the storage units 18, are divided into one or more LUNs each. A load balancing function is a form of a load distribution function, in which an attempt is made at distributing the load of data traffic evenly over multiple data paths. In this case, the load balancing function staggers LUNs within the storage units 18 between the HBAs 12A and 12B to distribute the loads. The LUN masking function enables specific LUNs to be masked so that the OS 32A has no knowledge of the masked LUNs and cannot access them.

The SPM 38B may be the Auto Path software product from Hewlett-Packard Company, for example. The Auto Path product also provides automatic failover and load balancing functions. The SPM 38B interacts with the HBA driver 37 in a conventional manner to control the operation of the HBAs 12C and 12D. The servers 10A and 10B may also be implemented with various other SPMs, such as the SANPoint Foundation Suite software product from Veritas Software Corporation.

Existing SPMs generally detect available data paths, provide load distribution functions, detect SAN failures and/or receive information regarding SAN failures, perform failovers, detect network corrections and/or receive notifications of corrections, and perform failbacks. The load distribution functions may include a round-robin function and/or a load balancing function. With the round-robin function, data is generally routed on an alternating or rotating basis among available data paths. For example, the SPM 38A might distribute consecutive data transfers alternately between the first and second data paths described above. With the load balancing function, data is generally distributed between available data paths so that each data transfer goes through the data path that has the lightest load at the time the data transfer is initiated.

SUMMARY OF THE INVENTION

A virtual computer system may be attached to a multipath data storage system. The virtual computer system may comprise one or more virtual machines (VMs). The data storage system may comprise one or more data storage devices or units. The data storage system may be directly connected to the virtual computer system, or it may be connected through a network, including possibly a storage area network. There are multiple data paths between the virtual computer system and the data storage system.

The virtual computer system may comprise a storage path manager, a VM manager, a resource manager and/or a storage virtualizer, one or more of which, including possibly all or none of which, may be integrated into a kernel, which may be used to support the one or more VMs.

In the invention, VM-specific information may be used when making multipath routing decisions, and/or multipath routing information may be used when making VM management decisions and/or resource management decisions. VM-specific information and multipath routing information may also be used together when making multipath routing decisions, VM management decisions and/or resource management decisions.

VM-specific information may include which VMs are running in the virtual computer system, which VM is involved with a specific data transfer request, what the relative priorities are for the VMs in the virtual computer system, and/or the amount of disk bandwidth that has been allocated to each of the VMs. Multipath routing information may include which data paths are available for routing a data transfer request, what the data loads are for the available paths, and/or whether a failover or failback is occurring or has occurred relative to a path that is relevant to a multipath routing decision.

Multipath routing decisions may include whether a failover or a failback is to be initiated, whether the routing of a data transfer request is to proceed or be delayed, and/or over which path a data transfer request is to be routed. VM management decisions may include whether a VM is to be temporarily suspended, suspended indefinitely and/or migrated to a different physical computer system. Resource management decisions may include whether or not a VM has reached its allocation for a resource, such as a disk bandwidth allocation, and/or which of multiple VMs should be given precedence when attempting to satisfy conflicting resource allocations.

Various algorithms may be used in making decisions under the invention, including possibly a first algorithm for deciding whether a data transfer request is to be routed or queued and a second algorithm for selecting a path over which data is to be routed. The possible algorithms that may be used for any decision under this invention may vary dramatically in complexity. An algorithm that may be used for selecting a path over which data is to be routed may be a load distribution algorithm, including possibly a load balancing algorithm.

DETAILED DESCRIPTION

The invention relates to implementing a SPM within a virtual computer system to facilitate access to a redundant, multipath data storage system. In this description, the term "multipath" refers to any data storage system, unit or network that provides multiple data paths between the virtual computer system and the data storage; the term "redundant" generally refers either to providing multiple copies of a set of data or to the inherent redundancy of the multiple data paths of a multipath data storage system. The invention can be implemented in any virtual computer system connected directly, or indirectly, to any SAN or other multipath data storage unit, system or network.

Figure 4:
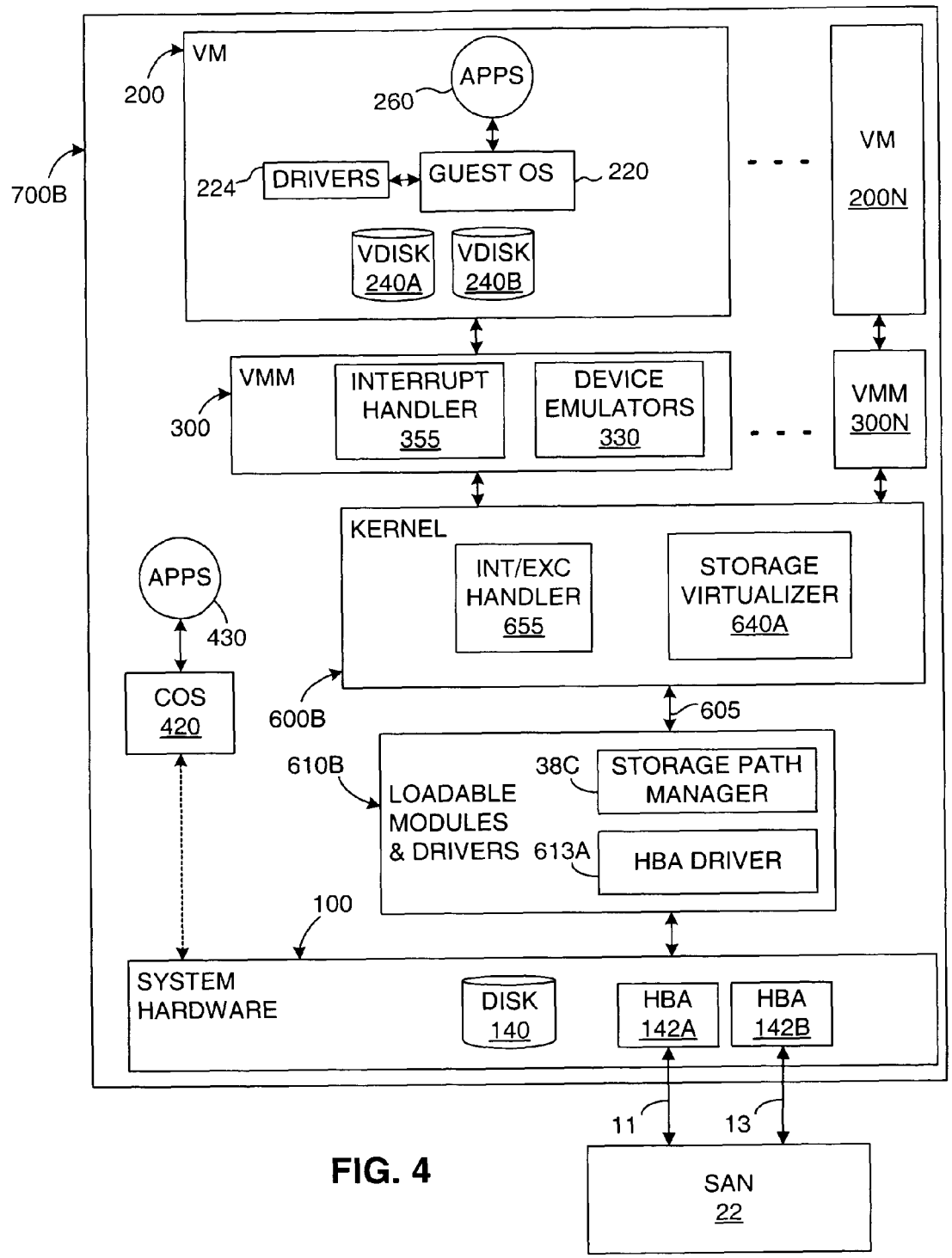
FIG. 4 illustrates a virtual computer system connected to a storage area network, in which a storage path manager is implemented as a driver or loadable module.

FIG. 4 illustrates a virtual computer system 700B connected to the SAN 22 by the data paths 11 and 13. The system 700B comprises the system hardware 100, the console OS 420 and applications 430, a kernel 600B, a set of loadable modules and drivers 610B, and a plurality of VMMs 300 to 300N, supporting a plurality of VMs 200 to 200N, respectively. The system hardware 100 may constitute a conventional server computer based on the Intel IA-32 architecture, for example. The system hardware 100 includes a disk 140, a first HBA 142A and a second HBA 142B. The disk 140 may be a standard hard drive for a conventional server computer, for example, while the HBAs 142A and 142B may be conventional Fibre Channel host bus adapters, such as those from Qlogic Corporation or Emulex Corporation. The kernel 600B is similar to the kernel 600A described above, including the interrupt/exception handler 655. The VMM 300 includes the interrupt handler 355 and the device emulators 330, as described above, and the VM 200 includes the guest OS 220, the drivers 224 and the applications 260, as described above.

The kernel 600B also includes a storage virtualizer 640A. The storage virtualizer 640A, along with one of the device emulators 330, virtualizes all or part of the disk 140 to create a first virtual disk 240A for use by the VM 200. For example, different portions of the disk 140 may be used for storage by the different VMs 200 to 200N, but each of these portions of the disk 140 is presented as a complete hard disk to the respective VM. In this way, when the VM 200 writes data to the virtual disk 240A, believing it to be a complete hard disk, the data is actually stored on the appropriate portion of the disk 140. Each of these portions of the disk 140 may be implemented as a file stored on a partition of the disk 140, or as an entire partition of the disk 140.

In a similar manner, the storage virtualizer 640A and the device emulator 330 virtualize all or part of one or more LUNs from the SAN 22 to create a second virtual disk 240B. Thus, when the VM 200 writes data to the virtual disk 240B, again believing it to be a complete hard disk, the data is actually stored on an appropriate LUN of the SAN 22. The storage virtualizer 640A and device emulator 330 may create one or more virtual disks for each of the VMs 200 to 200N from the LUNs of the SAN 22 in the same manner. Similarly, local LUNs or portions of local LUNs may also be virtualized as complete disks.

Each of the virtual disks 240A and 240B may be presented to the VM 200 as if it is a local disk attached directly to the VM 200 by a common, standard interface. For example, each of the virtual disks 240A and 240B may appear to the VM 200 to be a direct-attached SCSI drive connected to a standard SCSI adapter. In this way, even if the system hardware 100 includes a variety of physical adapters, such as SCSI, RAID or Fibre Channel adapters for connecting to the SAN 22 or other data storage units, the guest OS 220 need only interface with a single type of SCSI adapter, which is virtualized by the device emulator 330. A single SCSI driver can be loaded into the guest OS 220, regardless of the number or types of data storage devices, units or systems that are accessible to the virtual computer system 700B. A person of skill in the art will understand how to virtualize the disks 240A and 240B in the manner described herein.

Figure 3:
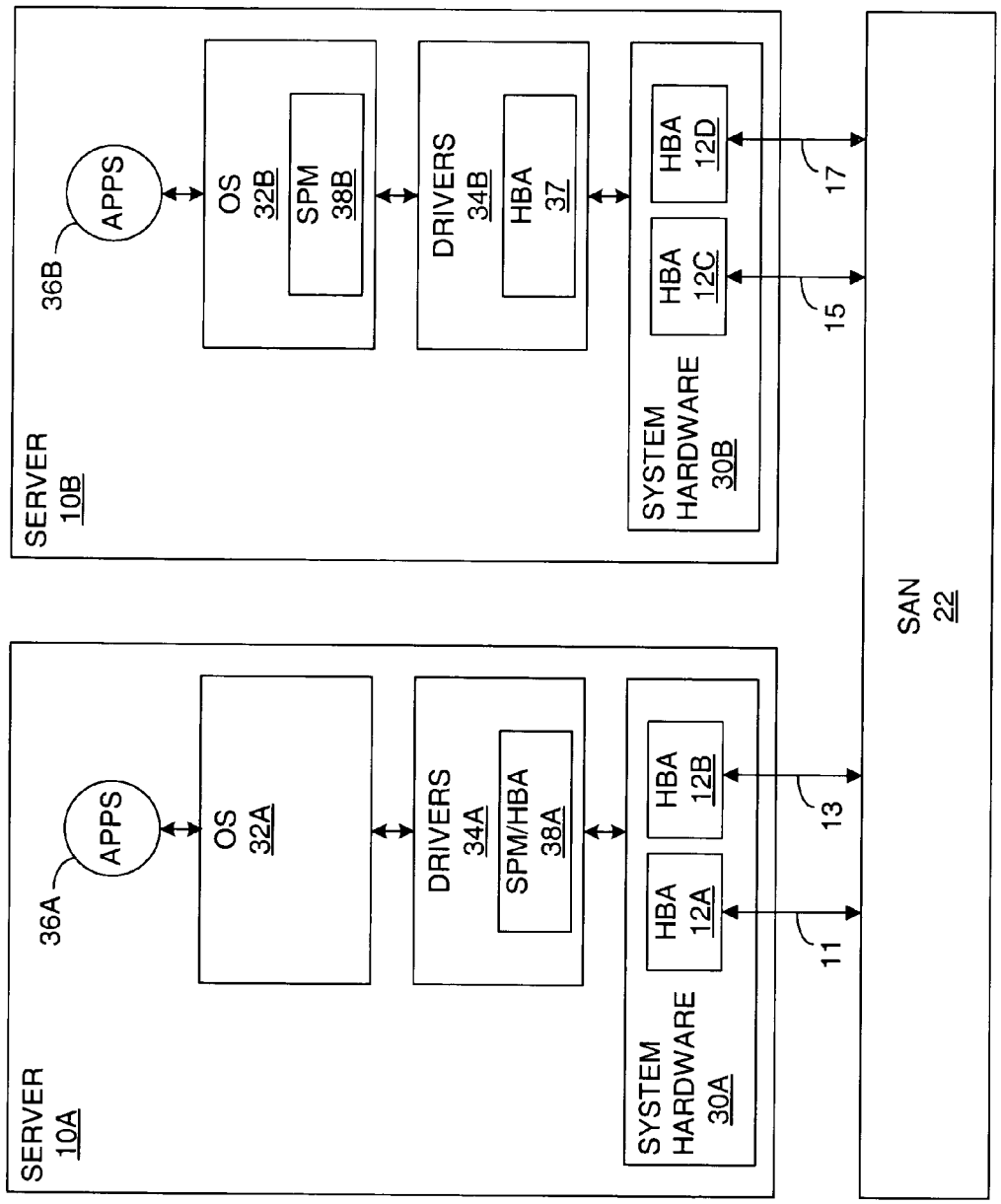
FIG. 3 illustrates the main components of two servers that are connected to a storage area network, one server having a storage path manager implemented in a driver and the other having a storage path manager implemented in the operating system.

FIG. 4 also shows a SPM 38C and a HBA driver 613A within the modules and drivers 610B. The SPM 38C and the HBA driver 613A are shown as distinct units in FIG. 4 because they are functionally distinguishable from one another. However, they may be implemented within the same module or driver. For example, a module or driver 610B implementing the SPM 38C and the HBA driver 613A may be substantially the same as the SPM 38A described above, except that the module or driver 610B is designed to interface with the kernel 600B, instead of the OS 32A of FIG. 3. The SPM 38C may perform the same functions as the SPM 38A of FIG. 3, in substantially the same manner, including the failover and failback functions, along with the load balancing function and the LUN masking function. Alternatively, the SPM 38C may be a stand-alone module or driver that interfaces with another stand-alone module or driver, the HBA driver 613A. In this case, the SPM 38C may perform the same data routing functions as the SPM 38A, while the HBA driver 613A may be substantially the same as the HBA driver 37 of FIG. 3.

The modules and drivers 610B are analogous to and may be substantially the same as corresponding device drivers that are loaded into a conventional OS. Like OS device drivers, the modules and drivers 610B are not integrated into the kernel 600B. Instead, the modules and drivers 610B interface with the kernel 600B using an API that is similar to the APIs used between conventional OSs and device drivers, such as the Linux Device Driver Module API, for example. Accordingly, FIG. 4 shows an API 605 between the kernel 600B and the modules and drivers 610B. The information that is shared over such an API is typically quite limited, and the coordination between the software entities on opposite sides of the API is also quite limited.

For example, suppose a software entity within the VM 200 attempts to read a block of data from the virtual disk 240B. The storage virtualizer 640A determines the corresponding block of data on the corresponding LUN of the SAN 22 and issues a request for the data over the API 605 to the SPM 38C. Such a request typically specifies the block(s) of data to be retrieved and the LUN from which the data is to be retrieved. The SPM 38C typically would not know that the request for data originated from within the VM 200. Nonetheless, the SPM 38C would then select a data path to the SAN 22 and request the specified data through one of the HBAs 142A or 142B, using the HBA driver 613A. The appropriate storage processor 16A, 16B, 16C or 16D would retrieve the specified data and return it to the SPM 38C. The data would then be conveyed through the storage virtualizer 640A, back to the appropriate entity within the VM 200. The storage virtualizer 640A typically would not know how the block of data was routed between the virtual computer system 700B and the SAN 22.

In such an implementation, the SPM 38C would not have much information about the VMs 200 to 200N or the VMMs 300 to 300N, and the kernel 600B would not have much information about the routing of data by the SPM 38C. In the preferred embodiment of this invention, on the other hand, a SPM is integrated, at least partially, into a kernel, and there is a significantly greater exchange of information between the SPM and the kernel. This increased integration and communication provides more effective routing of data between a virtual computer system and a redundant, multipath data storage system, and it may improve the management of VMs by the kernel.

Figure 5:
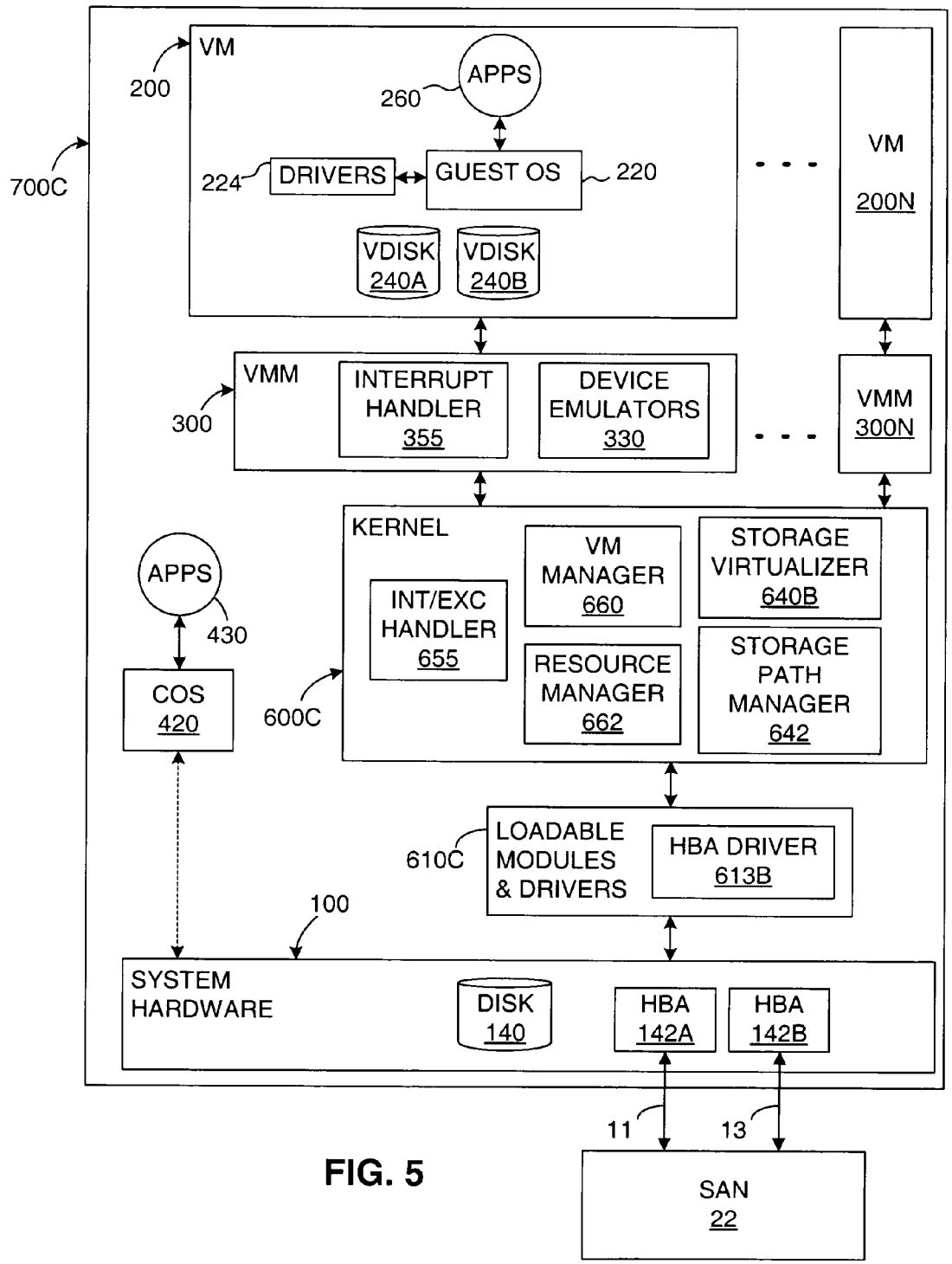
FIG. 5 illustrates another virtual computer system connected to a storage area network, in which a storage path manager is integrated into a kernel.

FIG. 5 illustrates a virtual computer system 700C, in which the preferred embodiment of the invention is implemented. The computer system 700C is connected to the SAN 22 by the paths 11 and 13. The computer system 700C includes the system hardware 100, including the disk 140 and the HBAs 142A and 142B. The system 700C also includes the console OS 420 and applications 430. The computer system also includes a different kernel 600C and a different set of loadable modules and drivers 610C. The kernel 600C supports the VMMs 300 to 300N, which support the VMs 200 to 200N, respectively. As further shown in FIG. 5, the VMM 300 includes the interrupt handler 355 and the device emulators 330, while the VM 200 includes the virtual disks 240A and 240B, the guest OS 220, the drivers 224 and the guest applications 260.

FIG. 5 also shows a HBA driver 613B as one of the modules and drivers 610C. The HBA driver 613B may be a basic HBA driver, substantially similar to a conventional driver from QLogic Corporation or Emulex Corporation, for example, but designed to interface with the kernel 600C, instead of an OS. In particular, the HBA driver 6136 need not have any functions of a SPM.

In the preferred embodiment, a SPM 642 is integrated into the kernel 600C, instead of interfacing with the kernel 600C through an API. The kernel 600C also includes the interrupt/exception handler 655, a VM manager 660, a resource manager 662 and a storage virtualizer 640B. The storage virtualizer 640B is substantially the same as the storage virtualizer 640A described above. The VM manager 660 and the resource manager 662 may be combined into a single software unit or they may be implemented as separate units as illustrated in FIG. 5. The VM manager 660 and the resource manager 662 are illustrated and described as separate units herein simply because they have distinct functions. The VM manager 660 performs high-level functions related to the control and operation of the VMs 200 to 200N. For example, the VM manager 660 may initialize a new VM, suspend an active VM, terminate a VM or cause a VM to migrate to another physical computer system. The VM manager 660 may perform these actions in response to a variety of stimuli or conditions, such as in response to commands from a system administrator at a control console, in response to conditions within a VM or in response to other conditions within the virtual computer system 700C.

The resource manager 662 generally allocates system resources between the multiple VMs 200 to 200N, as well as between the other worlds within the virtual computer system. For example, the resource manager 662 schedules and manages access to the CPU(s), the memory, any accessible network resources and the data storage resources. The resource manager 662 may allow a system administrator to specify various levels of service that are to be provided to each of the VMs 200 to 200N for each of the system resources. For example, an application 430 running on the COS 420 may provide a user interface to a system administrator, enabling the system administrator to control numerous system parameters, including the levels of service of system resources for the multiple VMs 200 to 200N. The resource manager 662 then works with other units within the computer system 700C to provide the requested levels of service.

In many ways, the operation of the kernel 600C is similar to the operation of an OS. For example, just as a multitasking OS switches between multiple processes, the kernel 600C switches between multiple worlds, as described above. In addition, however, the kernel 600C provides other functions that are more specific to the virtual computing environment. For example, as mentioned above, the resource manager 662 may provide particular VMs with guaranteed levels of CPU time. Of course, the resource manager 662 and/or other units within the kernel 600C must have access to information about the VMs and/or the VMMs to implement such VM-specific functions. Regarding the allocation of CPU time, for example, the resource manager 662 must have access to information such as which VMs exist and how much CPU time has been guaranteed to each VM.

Similarly, integrating the SPM 642 into the kernel 600C provides the SPM 642 with access to information about the VMs and VMMs, enabling the SPM 642 to implement VM-specific functions as well. For example, suppose that the computer system 700C includes only the two VMs 200 and 200N. The SPM 642 can determine the existence of these two VMs 200 and 200N, and it can determine whether specific SAN data transfers relate to the first VM 200 or to the second VM 200N. The SPM 642 can then use this information in deciding how to route data between the computer system 700C and the SAN 22. For example, the SPM 642 may route all data related to the first VM 200 through the first HBA 142A, and all data related to the second VM 200N through the second HBA 142B. Routing data in this manner provides greater isolation between the operation of the first VM 200 and the second VM 200N. Data traffic of the two VMs 200 and 200N are less likely to interfere with each other if they are transferred over different HBAs.

The SPM 642 may also receive additional information and work with other units within the kernel 600C to provide other VM-specific functions. For example, the SPM 642 may receive information from the resource manager 662 regarding the amount of disk bandwidth to be allocated to each of the multiple VMs. The SPM 642 may then use this information to determine whether a request for a data transfer from a specific VM should be routed immediately or placed on a queue for routing at a later time, to ensure that the specific VM does not exceed its allocated disk bandwidth. Several such VM-specific functions are described below in connection with FIGS. 6 and 7.

Figure 6:
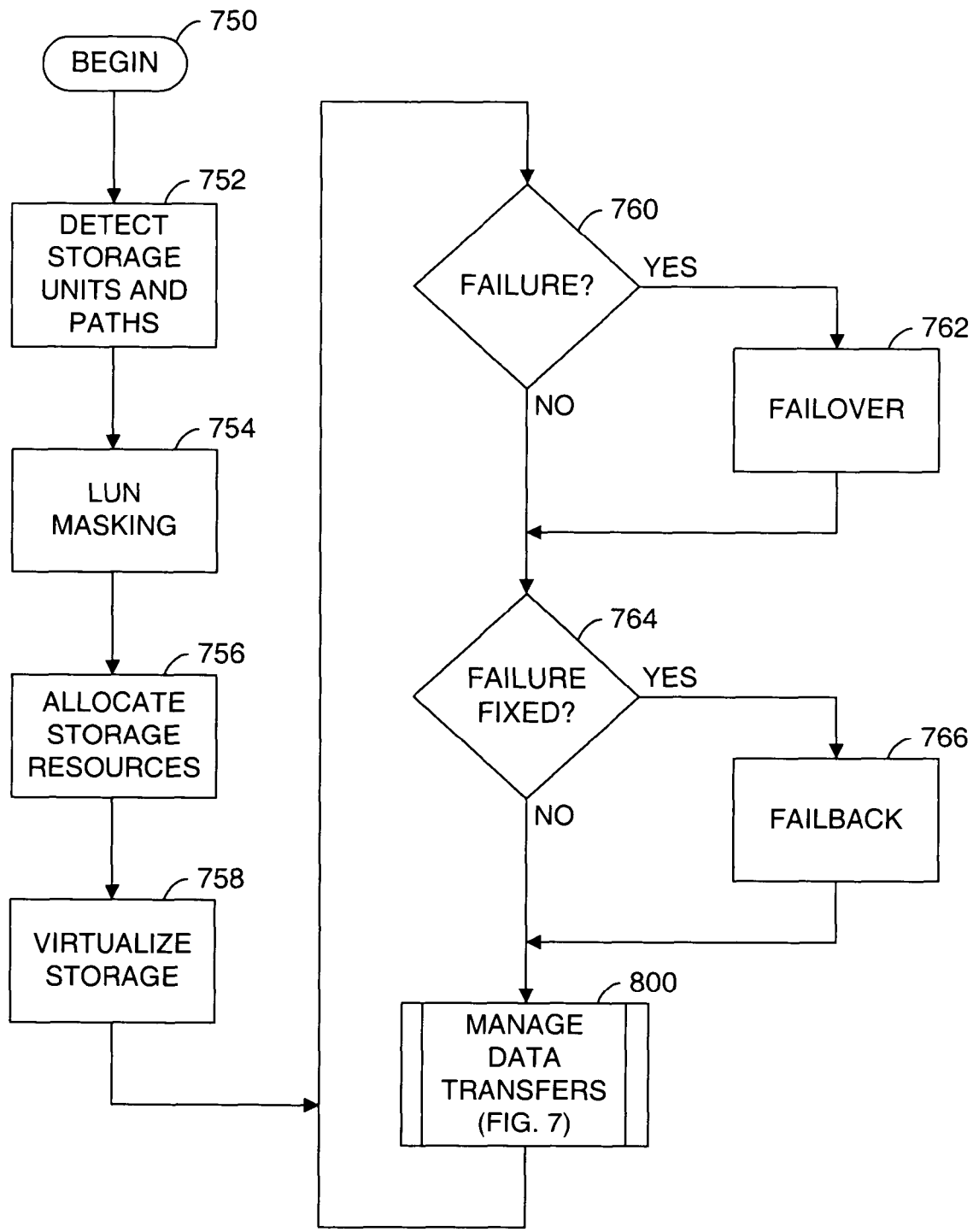
FIG. 6 illustrates a general method that is performed by the storage path manager and kernel of FIG. 5 to transfer data between the virtual machines and the storage area network.

FIG. 6 is a flow chart illustrating a method that is performed by the SPM 642, along with other units within the kernel 600C, to manage data transfers between the virtual computer system 700C and the SAN 22 of FIG. 5. The method begins at an initial step 750.

At a step 752, the SPM 642 determines all of the LUNs of all of the storage units that are accessible within the SAN 22. The SPM 642 also determines all of the paths by which each LUN may be accessed. More specifically, the SPM 642 interfaces with the HBA driver 613B, in a conventional manner, to scan each of the HBAs 142A and 142B to determine all devices on each of the HBAs and all LUNs on each of the devices. According to convention, each LUN in the SAN 22 has a LUN number that is unique within the particular storage unit, but not necessarily within the entire SAN 22, along with a LUN identification number (LUN ID) that is unique throughout the entire SAN 22.

For each of the HBAs 142A and 142B, the SPM 642 first determines all of the devices that are accessible through the HBA. Next, the SPM 642 attempts to access every possible LUN number on each device that is accessible through each HBA. The range of possible LUN numbers may be specified by a system administrator, otherwise, a default range of possible LUN numbers may be used. Whenever an attempted access is directed to a HBA, a device and a LUN number for which a LUN exists, the LUN responds. Each time a LUN responds, the SPM 642 then queries the LUN to determine its LUN ID. Throughout the scan, the SPM 642 keeps track of the paths for which a LUN response was received, along with the corresponding LUN IDs. The SPM 642 compiles a series of path names indicating all paths to all LUNs, with each path name comprising a HBA name, a device number and a LUN number. For example, a path name may take the form of "vmhba0:0:2", where the HBA name is "vmhba0", the device number is 0 and the LUN number is 2.

Now if there are multiple paths to the same LUN, this can be determined by matching up the LUN IDs that are returned by the LUNs. If multiple queries result in the same LUN ID being returned, then the multiple paths over which the queries were sent lead to the same LUN. These paths will have the same returned LUN ID, but different combinations of HBA names, device numbers, and LUN numbers. For this discussion, assume that the first HBA 142A has a name of vmhba0 and the second HBA 142B has a name of vmhba1. Thus, for example, if the same LUN ID is returned in response to queries over paths having path names of vmhba0:0:2 and vmhba1:0:3, this reveals that this same LUN can be accessed through the first HBA 142A at device number 0 and LUN number 2, or through the second HBA 142B also at device number 0, but at LUN number 3. Each LUN is preferably given a canonical name, such as the path name corresponding to the first path that is associated with the LUN. The detection of storage units and paths at the step 752 may take place at various times, including during system initialization and at various times during system operation, either automatically or in response to an administrator command, for example.

Next, at a step 754, the SPM 642 may mask one or more LUNs of the SAN 22 in a conventional manner, so that they are not visible to or available for use by the VMs 200 to 200N. A system administrator may specify any desired LUN masking. At a step 756, the resource manager 662 allocates data storage space between the multiple VMs, including space from both the local disk 140 and the storage resources of the SAN 22. As described above, a system administrator may specify the allocation of storage space. For example, the VM 200 may be allocated a portion of the local disk 140, implemented as a file within a partition on the disk 140, along with one or more LUNs of the SAN 22. Other variations of data storage allocations are also possible, as described above.

Also at the step 756, the resource manager 662 allocates disk bandwidth for accessing the SAN 22 between the multiple VMs 200 to 200N. In the preferred embodiment, disk bandwidth is allocated separately for each disk in the SAN 22, and the resource manager 662 may guarantee one or more disk bandwidth settings to the respective VM(s). Disk bandwidth may be allocated according to a number of different sharing algorithms. In the preferred embodiment, the resource manager 662 implements a proportional-share approach to disk bandwidth allocation. Under this approach, each VM is allocated a number of shares of disk bandwidth for each disk, between a minimum and a maximum allowable number of shares, with the minimum possibly being zero. The disk bandwidth provided to each VM for a given disk is then equal to the number of shares allocated to the VM for the disk divided by the total number of shares allocated for the disk to all of the VMs that are currently running, if all of the running VMs are actively issuing commands to the disk.

Suppose, for example that three VMs are currently running and actively issuing commands to a disk, including a first and second VM each being allocated 2000 shares of disk bandwidth and a third VM being allocated 1000 shares of disk bandwidth, so that the total number of shares of all running VMs is 5000 (2000+2000+1000). In this example, the first VM is entitled to forty percent of the total disk bandwidth (2000÷5000), the second VM is also entitled to forty percent of the total disk bandwidth (2000÷5000), and the third VM is entitled to the remaining twenty percent of the total disk bandwidth (1000÷5000). Suppose next that the first VM stops running for some reason. Now, there are only 3000 shares of disk bandwidth allocated to the running VMs, and the second VM is entitled to 67 percent of the disk bandwidth (2000÷3000), while the third VM is entitled to the remaining 33 percent of the disk bandwidth (1000÷3000).

If a VM is not using its entire allocation of disk bandwidth for a disk, then only the shares for that VM corresponding to the used bandwidth count toward the total number of shares allocated for the disk. Thus, a distinction is drawn between "used" disk bandwidth and "allocated" disk bandwidth. In the example above, where the first and second VMs are allocated 2000 shares and the third VM is allocated 1000 shares for a disk, suppose that the first VM uses only twenty percent of the total bandwidth for the disk, even though it is entitled to use up to forty percent of the total bandwidth. In this case, the remaining eighty percent of the total disk bandwidth is divided between the second VM and the third VM according to their relative allocations. The second VM is entitled to use about 53.3 percent of the total disk bandwidth, while the third VM is entitled to use about 26.7 percent of the total disk bandwidth, because the second VM has been allocated twice as many shares as the third VM.

The proportional amount of disk bandwidth used by each VM may be determined by tracking virtual times and disk bandwidth consumption units. Virtual times and/or disk bandwidth consumption units are actually calculated or updated each time a new data transfer is processed, such as at a step 800 of FIG. 6, or, more precisely, at a step 808 of FIG. 7. In one embodiment, each command for disk access, along with the first 4 kilobytes (KB) of data transferred, if it is a data transfer operation, consume a single consumption unit for the accessed disk. Each additional 4 KB of transferred data adds another consumption unit. A local virtual time is tracked for each VM, and for each disk accessed by each VM. A local virtual time represents a VM's consumption of disk bandwidth relative to its allocation of bandwidth for a particular disk. All local virtual times are initially set to zero. Then, when a VM accesses a disk, its local virtual time for the disk is increased by the number of consumption units involved in the disk access divided by the number of shares of disk bandwidth allocated to the VM, so that changes in local virtual time are inversely proportional to the number of shares allocated to a VM. As a result, local virtual times will increase more quickly for VMs that have lower share allocations. When multiple VMs are attempting to access the same disk, the VM with the lowest local virtual time for the disk will generally be allowed access. Thus, when a VM attempts to access a disk, its disk commands are generally routed to the disk only if its local virtual time for the particular disk is lower than the local virtual time of any other VM that is attempting to access the disk, and only for so long as its local virtual time remains the lowest.

In addition, however, a VM is allowed to continue issuing disk commands, without being preempted by another VM, until the active VM has issued a predefined scheduling quantum of disk commands, so long as the disk commands access sequential sectors on the disk. A default scheduling quantum may be set at eight, for example. Providing this minimum scheduling quantum of disk commands may improve overall throughput of data between the computer system 700C and the SAN 22.

The local virtual times may also be monitored to ensure that they fall within specified ranges over selected time intervals, to ensure that no VM may monopolize disk bandwidth or is locked out of using a disk for an extended period of time due to previous usage patterns. For example, if a VM has not used a disk for a long time, its local virtual time may be much lower than the local virtual times of any of the other VMs. If the VM then has a large amount of data to transfer to or from the disk, it will begin issuing data transfer requests and might be able to exclude other VMs from using the disk while its local virtual time gradually increases. Instead, however, the number of consumption units that the newly active VM will be permitted to use over any particular time interval will be limited to a certain maximum value. This limitation ensures that other VMs will still have some access to the disk, even if the newly active VM's local virtual time remains the lowest. Similarly, a VM will be allowed some minimum disk bandwidth during each time interval, even if its local virtual time is not the lowest of all VMs attempting to access a disk.

Each of the values for the disk bandwidth sharing algorithm, including the scheduling quantum of disk commands, the definition of a consumption unit, the definition of a local virtual time, the time periods over which local virtual times are monitored and the range of permitted local virtual time values, may be set by a system administrator, they may be pre-defined, or they may be set according to some static or dynamic algorithm.

Again, a system administrator may be allowed to specify the number of shares that are allocated to each of the VMs in the computer system 700C for each of the disks in the SAN 22. Then, based on the relative shares of the VMs that are running at a given time and the actual usage of disk bandwidth by each of the VMs, the resource manager 662 determines for each disk, the percentage of the total disk bandwidth to which each VM is entitled. As mentioned above, other techniques may also be used to allocate disk bandwidth between the multiple VMs, including priority-based scheduling and partitioning approaches. Also, the implementation of the different allocation techniques may vary widely. For example, in a share-based allocation technique, other methods may be used to determine when a VM has reached its allocation of disk bandwidth, other than tracking consumption units and local virtual times, as described above.

At a step 758, the storage virtualizer 640B virtualizes the storage resources that are allocated to each of the VMs 200 to 200N, as described above. For example, for the first VM 200, the storage virtualizer 640B may emulate a first local SCSI disk attached to a first SCSI adapter to create the first virtual disk 240A, corresponding to a portion of the local physical disk 140, and the storage virtualizer 640B may emulate a second local SCSI disk attached to a second SCSI adapter to create the second virtual disk 240B, corresponding to a LUN of the SAN 22.

The steps 754, 756 and 758 may be performed at various times as well, like the step 752, as described above. For example, the steps 754, 756 and 758 may be performed during system initialization and at various times during system operation, either automatically or in response to an administrator command. Each of the steps 752, 754, 756 and 758 may be performed individually, or in combination with one or more of the other steps, at different times, as appropriate. For example, if a system administrator allocates an additional virtual disk to a VM, the storage virtualizer 640B will typically automatically perform the step 758 to virtualize the newly allocated disk space, for use by the VM. As another example, the SPM 642 may automatically perform the step 752 at various times to identify various changes to the SAN 22, such as the addition of a new LUN or the repair of a path that had previously failed.

After the step 758, the method of FIG. 6 proceeds to a step 760. At the step 760, the SPM 642 determines whether there has been any failure related to the transfer of data between the computer system 700C and the SAN 22 that prevents the transfer of data over any of the paths identified at the step 752.

Figure 1:
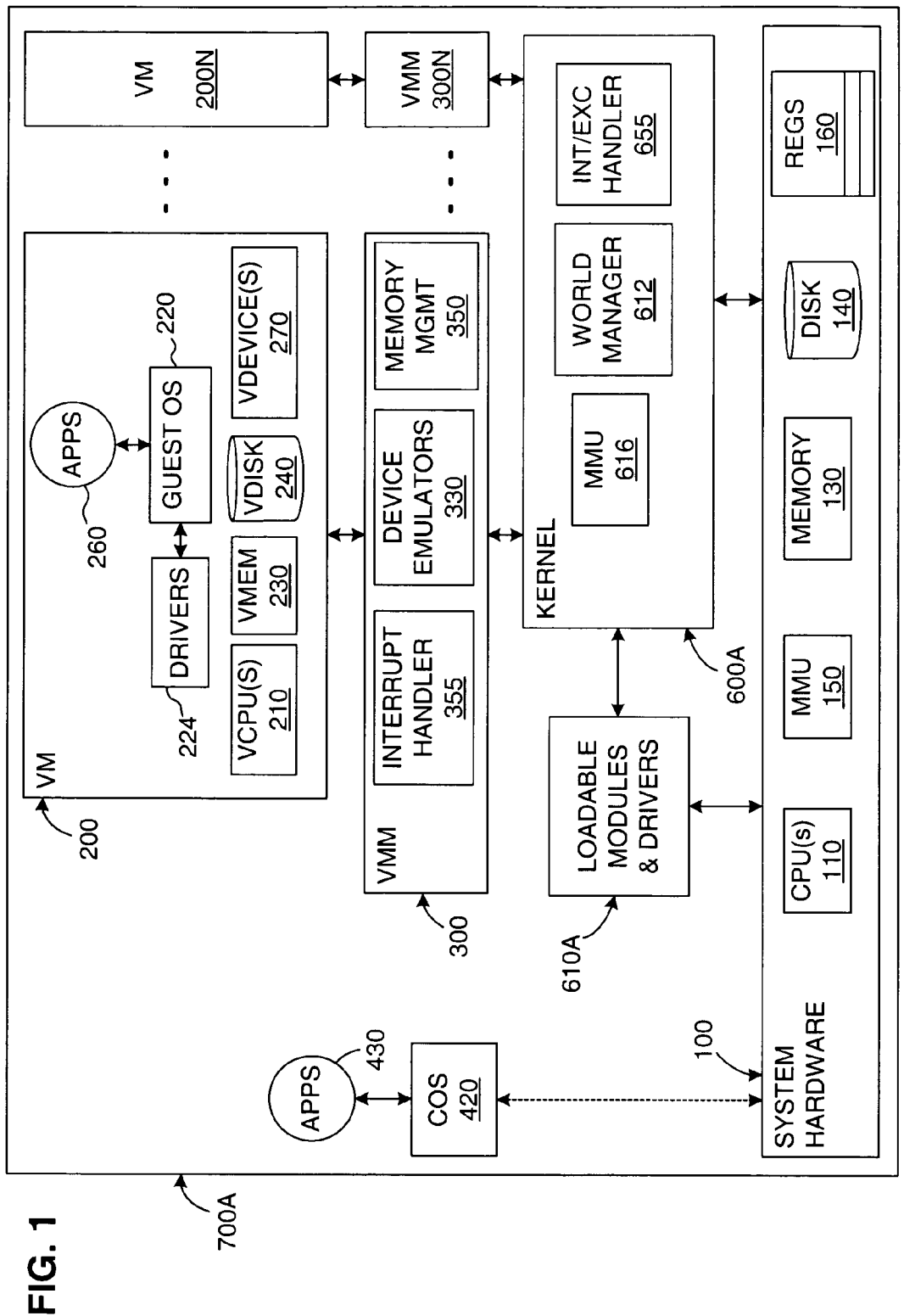
FIG. 1 illustrates the main components of a kernel-based, virtualized computer system.
Figure 2:
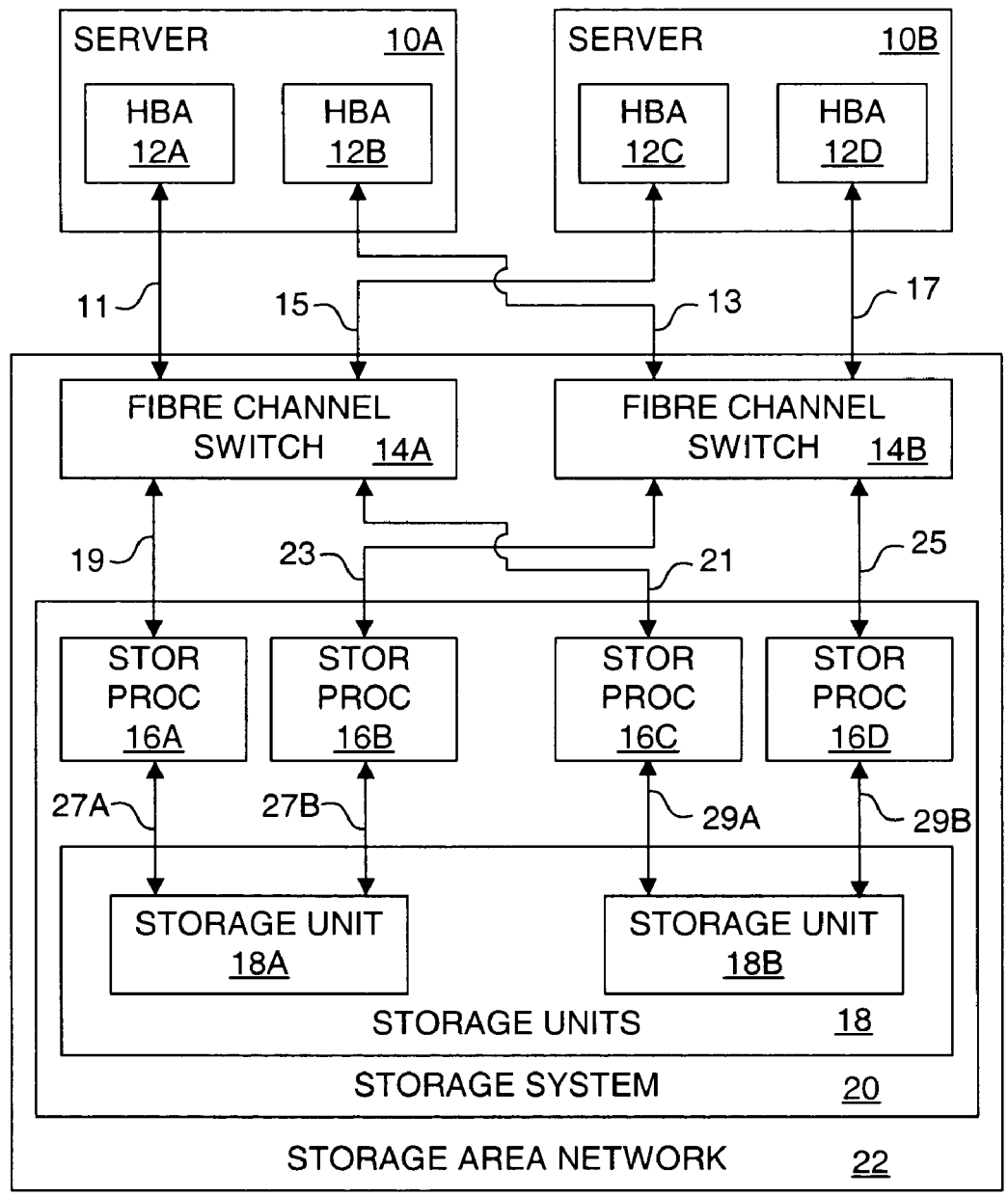
FIG. 2 illustrates the main components of a generic storage area network, along with two generalized servers.

In a preferred embodiment of the invention, the SPM 642 can determine if there has been a failure at the first HBA 142A, at the second HBA 142B, at the path 11, at the path 13, or within the SAN 22. Referring more specifically to the SAN 22, as illustrated in FIG. 2, the SPM 642 can preferably determine if there has been a failure at any of the paths 19, 21, 23, 25, 27A, 27B, 29A and 29B, or at any of the devices 14A, 14B, 16A, 16B, 16C, 16D and 18. The SPM 642 makes these determinations by reference to the HBAs 142A and 142B. The SPM 642 may detect some failures at the HBAs 142A and 142B by direct interaction with the HBAs 142A and 142B. Otherwise, the HBAs 142A and 142B report to the SPM 642 if there are any other failures. The HBA 142A may detect failures within the HBA 142A or at the path 11, while the HBA 1426 may detect failures within the HBA 142B or at the path 13. The HBA 142A may determine other failures within the SAN 22 by receiving reports from the Fibre Channel switch 14A, while the HBA 142B may determine other failures within the SAN 22 by receiving reports from the Fibre Channel switch 14B. All such detections and reporting of failures may be performed in a conventional manner, according to the specifications of the FCIA.

If there is a failure that prevents the transfer of data over any of the paths identified at the step 752, then the method of FIG. 6 proceeds to a step 762. Otherwise, the method advances to a step 764. At the step 762, the SPM 642 takes appropriate steps, if possible, to avoid the path or paths that are affected by the failure determined at the step 760. More specifically, if one of the affected paths is currently being used for data transfers between the virtual computer system 700C and a LUN of the SAN 22, then the SPM 642 selects an alternate path for subsequent data transfers with the LUN, where the alternate path does not involve the failed device or path. In other words, the SPM 642 fails over from the affected path to the alternate path. If the failure relates to a HBA 142A or 142B, or one of the paths 11 or 13, then the failover is referred to as a HBA failover. If the failure relates to a storage processor 16A, 16B, 16C or 16D, or one of the paths 19, 21, 23, 25, 27A, 27B, 29A or 29B, then the failover is referred to as a SP failover. HBA failovers and SP failovers are performed in a conventional manner. Any other failures within the Fibre Channel network are handled within the network itself, according to the specifications of the FCIA. The SPM 642, along with the SAN 22, preferably provides multipath failover capabilities for failures related to HBAs, Fibre Channel switches, storage processors, and Fibre Channel cables. However, this invention may be implemented in various different systems in which various different combinations of failovers are supported. After the failover or other action is performed at the step 762, the method of FIG. 6 proceeds to the step 764.

At the step 764, the SPM 642 determines whether any previous failure for which a failover was performed has been corrected. This step may be performed at various times, either automatically or manually, such as in response to an administrator's command. Thus, a SAN administrator may replace a failed device or path within the SAN 22, for example, and then manually initiate the step 764. Alternatively, the SPM 642 may automatically perform the step 764 from time to time, until it detects that a failure has been corrected. Corrected failures are determined in substantially the same manner as described above at the step 760 for determining failures, in a conventional manner and according to the specifications of the FCIA.

If a failure has been corrected, then the method of FIG. 6 proceeds to a step 766. Otherwise, the method advances to the step 800. At the step 766, the SPM 642 takes appropriate action to resume using the affected path, if appropriate. For example, the SPM 642 may fail back to using the path that was used before the failover occurred. This fallback is performed in a conventional manner and according to the specifications of the FCIA. As an alternative, however, the failback may not occur immediately. Instead, the SPM 642 may wait for some other occurrence, such as a particular load balancing condition, before resuming the use of a path for which a failover has occurred. After the step 766, the method of FIG. 6 proceeds to the step 800.

Figure 7:
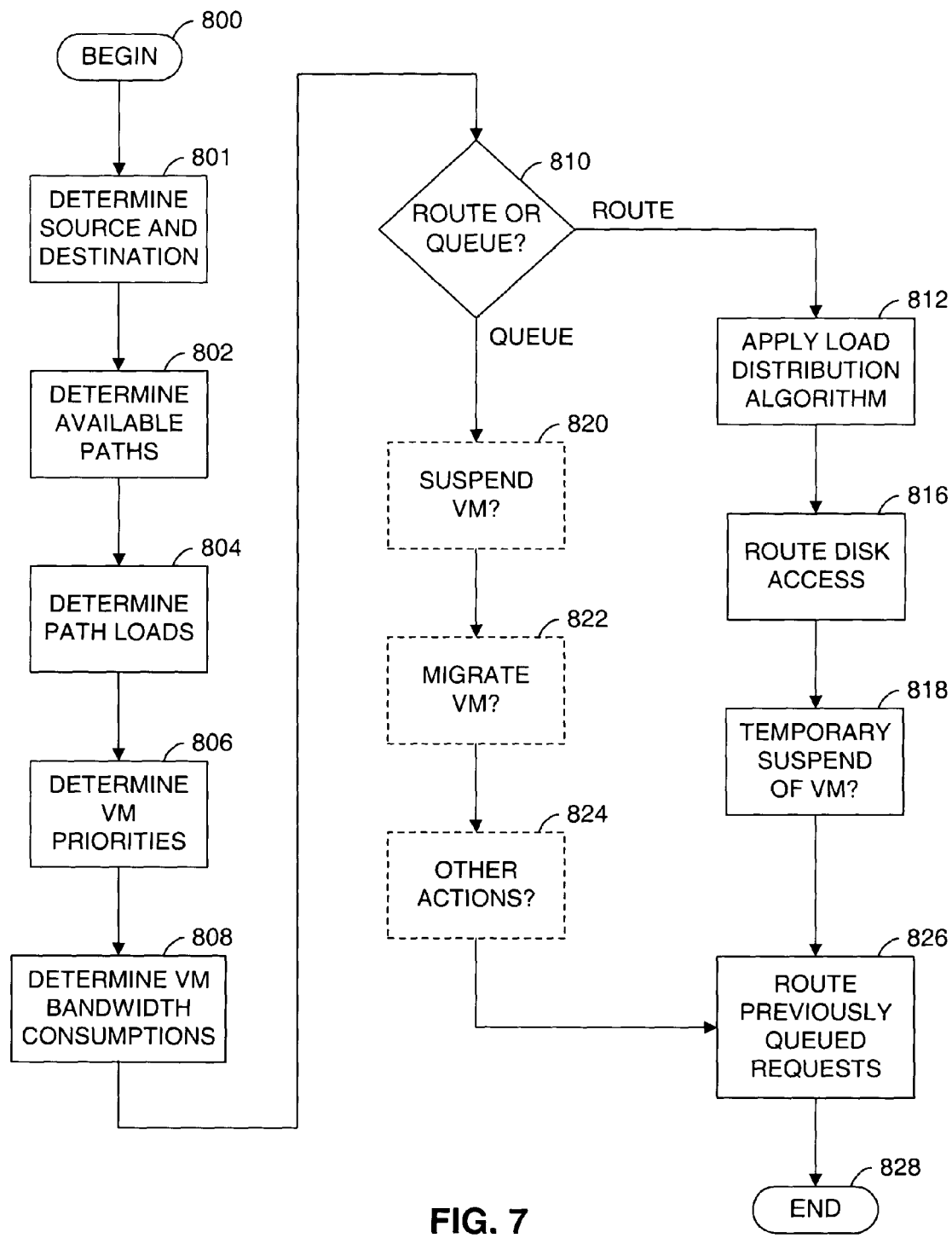
FIG. 7 illustrates a method that is performed by the storage path manager and kernel of FIG. 5 to manage a requested data transfer between a virtual machine and the storage area network.

At the step 800, the SPM 642 selects paths for data transfers between the computer system 700C and the storage units 18, and otherwise manages the data transfers between these systems. At the step 800, the SPM 642 performs a method that is illustrated in FIG. 7, which is described below. After the step 800, the method of FIG. 6 returns to the step 760.

The general method of FIG. 6 may be implemented in many different ways. The sequence of steps may be rearranged in many different ways and may be combined in different ways. In very general terms, the steps 752, 754, 756 and 758 are preferably performed during a system initialization, as well as at varying times throughout the operation of the system, while the steps 760, 762, 764 and 766 are performed after initialization, at varying times throughout the operation of the system, and the step 800 is performed whenever a data transfer is requested.

When a data transfer is requested, for example by one of the VMs 200 to 200N, the method of FIG. 7 is performed. The method begins at a step 800. At a step 801, the SPM 642 determines the source and the destination for the requested data transfer. For example, the SPM 642 may determine that the source is the VM 200 and the destination is a specific LUN in the SAN 22. This information is readily available to the SPM 642, within the kernel 600C. The method then proceeds to a step 802. At the step 802, the SPM 642 determines the path or paths over which the data may be transferred. At the step 752 of FIG. 6, the SPM 642 originally detected the paths to each of the LUNs. For example, as described above, the SPM 642 may have determined that the paths vmhba0:0:2 and vmhba1:0:3 were the only paths available for accessing a desired LUN. Suppose further, however, that a failure was determined at the step 760 of FIG. 6 related to the path vmhba0:0:2, and a failover was performed at the step 762 to use the path vmhba1:0:3, instead of the path vmhba0:0:2 for data transfers involving the desired LUN. In this case, if there is a data transfer involving the LUN, the SPM 642 determines at the step 802 that the only path available for use is the path vmhba1:0:3. If there had been no failure in the path vmhba0:0:2, or if the failure had been corrected, then the available paths would be vmhba0:0:2 and vmhba1:0:3.

Next, at a step 804, the SPM 642 determines the relative loads of data currently pending to be transferred on each of the paths determined at the step 802. The path loads may be determined in a variety of ways, depending on the system configuration. For example, the HBA driver 613B may keep track of the amount of pending data to be transferred over each available path. In this case, the SPM may obtain this information directly from the HBA driver 613B.

The information collected in the steps 801, 802 and 804 is pertinent to decisions that must be made related to routing data transfers between the virtual computer system 700C and the storage units 18 within the SAN 22. This information is referred to herein as "multipath routing information." Multipath routing information may also include other information related to routing data between a virtual computer system and the storage units of a SAN or other multipath data storage system, depending on the specific implementation.

Next, at a step 806, the SPM 642 determines priorities that have been assigned to each of the VMs 200 to 200N. For example, a system administrator may assign priorities to the different VMs using a console application, as described above. Alternatively, priorities may be assigned automatically, based on the functions performed by each of the VMs, for example. The priorities may apply to all system resources in general, or they may apply to specific system resources. For example, one VM may be assigned a higher priority with respect to disk bandwidth, while another VM is assigned a higher priority with respect to CPU time. The priorities may be designated by various means, such as by using numbers from 0 to 10. Depending on the relative priorities of the VMs that are competing for system resources, the SPM 642 and other units within the kernel 600C make different decisions and take different actions related to managing the VMs and their access to system resources.

Next, at the step 808, the SPM 642 determines the disk bandwidth shares that have been allocated to the VM requesting the data transfer, along with the total number of disk bandwidth shares that are being used by all the VMs, as described above. The SPM 642 may also determine the disk bandwidth shares that have been allocated to each of the other VMs, including any guaranteed disk bandwidth allocations. The SPM 642 may also, in effect, determine the amount of disk bandwidth that has been consumed by the VM requesting the data transfer relative to the amount of disk bandwidth that has been allocated to the VM, and the SPM 642 may, in effect, determine the amount of disk bandwidth that has been consumed by each of the other VMs relative to the amount of disk bandwidth that has been allocated to each of the other VMs. For example, referring to the method of tracking virtual times and disk bandwidth consumption units described above, the SPM 642 may calculate or update the virtual times and/or consumption units at this point and compare these values for all the VMs. Also, one or more of the VMs may be assigned specific minimum absolute bandwidth values. If possible, the SPM 642 will provide each of these one or more VMs with its specified minimum absolute bandwidth, regardless of the relative priorities of the VMs or the disk bandwidth shares allocated to each VM.

The information collected in the steps 806 and 808 relates specifically to the VMs within the virtual computer system 700C, and is thus referred to as "VM-specific information." VM-specific information may also include other information that is specific to the VMs within a virtual computer system, depending on the specific implementation. Such VM-specific information has not been made available to SPMs in prior art systems. However, in the preferred embodiment of this invention, the SPM does have access to this VM-specific information, and the SPM uses this information to make better data routing decisions.

Returning now to the method of FIG. 7, at a step 810, the SPM 642 applies an algorithm to determine whether the data transfer request should be routed immediately, or whether the request should be placed in a queue for routing at a later time. A wide variety of algorithms may be applied in making this decision, depending on a number of different factors. In particular, a disk bandwidth sharing algorithm may be implemented, such as the proportional-share approach described above. The algorithm may use some or all of the information collected during the steps 801, 802, 804, 806 and 808, along with other information not specifically mentioned above.

For example, if there is only one path available for transferring the data, if that one path has a relatively large backlog of pending data transfers, and if the VM requesting the transfer has a lower priority than another VM that is actively using the path, then the request may be queued. Also, if the VM requesting the transfer has reached its allocation for disk bandwidth and has already issued the scheduling quantum of disk commands, then the request may also be queued. On the other hand, if there is a path available that does not have a backlog of pending data transfers and if the VM has not reached its allocation of disk bandwidth, then the requested data transfer may be routed immediately.

Under this invention, the algorithm of the step 810 preferably uses multipath routing information, VM-specific information, or both, in making the decision as to whether a data transfer request should be queued or routed immediately. For example, returning to the situation described above, in which the paths vmhba0:0:2 and vmhba1:0:3 are the only paths available for accessing a desired LUN, suppose that the VM 200 is actively accessing the LUN. Suppose further that the two paths, vmhba0:0:2 and vmhba1:0:3, are independent of one another in terms of disk bandwidth, and that each of the paths has the same bandwidth. Suppose further that the VM 200 has been allocated a twenty percent share of the bandwidth to the LUN, but the VM has thus far only used about fifteen percent of the bandwidth. Now suppose that a SAN failure occurs that prevents the use of the path vmhba0:0:2, and then the VM 200 issues another data transfer request related to the LUN. With the failure of one of the two data paths, the disk bandwidth to the LUN is suddenly cut in half. Now the usage of disk bandwidth by the VM 200 represents about thirty percent of the reduced bandwidth to the LUN available after the failure. The usage by the VM 200 now exceeds the VM's share of disk bandwidth allocation. In this invention, the SPM 642 takes the multipath routing information of the SAN failure into account in determining whether the VM 200 has reached its allocation of disk bandwidth, which is a VM-specific decision. As a result, under these circumstances, the SPM 642 will determine that the disk bandwidth allocation has been reached, and the transfer request will preferably be queued, instead of being routed immediately.

Under normal conditions, the data transfer request would be routed immediately, despite the VM having exceeded its allocation for disk bandwidth, if the scheduling quantum has not yet been reached. However, because of the SAN failure, the SPM 642 may instead queue the request under the circumstances described above, even if the scheduling quantum has not yet been reached. In particular, if there is another active VM that has a higher priority or that has been guaranteed a specific disk bandwidth, the SPM 642 may decide to queue the request. Thus, in this situation, the SPM 642 may consider both VM-specific information (e.g. disk bandwidth allocations and priority assignments) and multipath routing information (e.g. the SAN failure and the available paths) at the same time, in making the decision whether a data transfer request should be queued or routed.

By queuing data transfer requests of low priority VMs upon SAN failures or upon other conditions leading to a disk bandwidth bottleneck, the higher priority VMs are more likely to receive the disk bandwidth they need, even under extreme circumstances. This aspect of the invention is particularly advantageous in virtual computer systems in which both critical applications and less important applications are executed. The VMs that execute the critical applications may be assigned a higher priority level, while the less important applications are assigned a lower priority level. Whenever a data bandwidth bottleneck occurs, the SPM 642 can automatically give precedence to the requests of the critical applications and defer the servicing of the less important applications. The critical applications receive the system resources they need, even under extreme circumstances. Meanwhile, under normal operating conditions, when there are adequate system resources to satisfy the critical applications and the less important applications, the less important applications are permitted to execute, which results in better utilization of all the resources of the entire server computer system.

A wide variety of algorithms may be used for the decision of the step 810, and a wide variety of criteria may be used in making the decision. A person of skill in the art will be able to implement a suitable algorithm, depending on the configuration of the particular system in which the invention is to be implemented, along with the desired functionality and characteristics of the system. The algorithm may be simple or it may be complex, depending on system requirements. Also, the algorithm may be entirely predefined, it may be partially or completely configurable by a system administrator, or it may be determined automatically, in whole or in part, based on various system parameters, such as the number of VMs, the relative priorities of the VMs, the functions performed by the VMs, the characteristics of the SAN 22, and various other parameters.

If a decision is made at the step 810 to queue the data transfer request, then the request will be routed at a later time, in a conventional manner, based on the normal scheduling of the kernel 600C and the availability of system resources. On the other hand, if a decision is made to route the request, the method of FIG. 7 proceeds to a step 812.

At the step 812, a load distribution algorithm is applied to select a path over which to route the request. This algorithm may be a simple load-balancing algorithm, such as one of the algorithms described above. For example, the algorithm may select the path over which the least amount of data is pending for transfer. Alternatively, the algorithm may perform a round-robin function, and alternate or rotate between all of the available paths. However, in the preferred embodiment, the algorithm is designed specifically for a virtual machine environment, using VM-specific information. For example, the path selected by the algorithm may depend on the particular VM involved in the data transfer, or it may depend on one or more characteristics of the VM or parameters associated with the VM, such as the priority assigned to the VM. For example, the algorithm could select a separate data path for the data transfers of each of the different VMs in the system, as described above. For example, for data transfers involving the two paths described above, data transfers related to the VM 200 could be routed over the path vmhba0:0:2, while data transfers related to the VM 200N could be routed over the path vmhba1:0:3. Various other algorithms are also possible, using various other criteria. For example, the data transfers for a lower priority VM may be isolated to a specific data path, while the data transfers for a higher priority VM may be routed over whichever path has the lowest amount of pending data to be transferred. A system administrator may design some or all of the functionality of the algorithm, or the administrator may specify certain parameters upon which the algorithm operates. Alternatively, the entire algorithm may be set automatically, based on the system configuration. Next, at a step 816, the SPM 642 routes the data over the selected data path in a conventional manner, such as by specifying a SCSI address.

Next, at a step 818, the SPM 642 decides whether the VM involved in the data transfer should be temporarily suspended. For this decision, the SPM 642 may again use both VM-specific information and multipath routing information. For example, suppose that a failover has recently been initiated at the step 762 of FIG. 6, and the failover must complete before the current data transfer can be completed. For example, suppose a failure has occurred that prevents the use of the path vmhba0:0:2, and a failover is initiated to use the path vmhba1:0:3, instead. If the current data transfer would have been routed over the path vmhba0:0:2 had there not been a failure, then the failover must complete before the data transfer can be completed.

Now, failovers typically take a significant amount of time to complete, such as approximately 30 seconds. Depending on the configuration of the VM involved in the data transfer, such as the guest OS involved and the particular guest application involved, the guest application may not wait long enough for the data transfer to complete. Instead, the guest application may detect a time-out error condition. To avoid this situation, the SPM 642 may initiate the suspension of the VM involved in the data transfer. More specifically, the SPM 642 may cause the VM manager 660 to suspend the VM. Existing VM technology makes possible the suspension and resumption of a VM. This feature is found, for example, in the ESX Server product mentioned above. Moreover, co-pending U.S. patent application Ser. No. 09/497,978, filed 4 Feb. 2000 ("Encapsulated Computer System"), which is incorporated here by reference, discloses a mechanism for checkpointing the entire state of a VM. Under this invention, the SPM 642 preferably knows whether a failover has been initiated with respect to the path involved in the current data transfer. The SPM 642 also preferably knows enough information about the source of the data transfer request to determine whether the source is likely to issue a time-out error condition. If a time-out is likely to occur, the SPM 642 may initiate a temporary suspension of the appropriate VM. Execution of the VM may then automatically resume after sufficient time has elapsed for the data transfer to complete.

If a decision is made at the step 810 that a data transfer request will be queued, instead of being transferred immediately, then the next step to be performed varies, depending on the particular embodiment of the invention. FIG. 7 shows a step 820, a step 822 and a step 824 as being optional, by using dashed lines. Each of these steps may be implemented or not, independently of the others, depending on the particular embodiment. The following description assumes that all of the steps 820, 822 and 824 are implemented, although any of them or all of them may be omitted.

At the step 820, the SPM 642 and/or the VM manager 660 may cause the VM involved in the data transfer request to be suspended, depending on the circumstances of the virtual computer system 700C and the SAN 22. The VM may be suspended for various reasons, such as to reduce the load on system resources. For example, suppose that a low priority VM is executing in the system described above, with only the two paths to a desired LUN. Suppose further that a SAN failure occurs that requires a failover from the path vmhba0:0:2 to the path vmhba1:0:3, and suppose that the low priority VM issues a data transfer request to the desired LUN. Suppose further that a higher priority VM is also actively accessing the same LUN. Also, suppose that the SPM 642 decides, at the step 810, that the request from the low priority VM should be queued, instead of routed immediately. With the reduced bandwidth to the LUN and the competition from the higher priority VM, the low priority VM may not get much disk bandwidth until the SAN failure is corrected and a failback occurs. In this situation, the SPM 642 may decide to suspend the low priority VM, perhaps until the failure is corrected and a failback occurs. Suspending the low priority VM in this situation may reduce system overhead and/or it may prevent the low priority VM from consuming precious bandwidth to the LUN.

Next, at the step 822, the SPM 642 may decide to migrate a VM from one physical server system to another. The migration of VMs is disclosed in U.S. patent application Ser. No. 10/319,217 ("Virtual Machine Migration"), which is incorporated here by reference. In general terms, a VM can be migrated from a source server to a destination server, with only a slight interruption in the execution of the applications running within the VM. A VM may be migrated to another server in this manner for a variety of reasons. For example, suppose several VMs within the virtual computer system 700C of FIG. 5 are actively accessing the data storage units 18 within the SAN 22 when the HBA 142A fails, forcing a failover to the HBA 142B. The bandwidth between the virtual computer system 700C and the SAN 22 has suddenly been cut in half again. The single HBA 142B may not be able to provide enough bandwidth to the SAN 22 for all of the VMs in the virtual computer system. To resolve this situation, one or more VMs may be migrated to another server computer that has not had any HBA failures. As described in the Virtual Machine Migration application, the relevant data related to the VM may be transferred from the source server to the destination server over a broadband network connection, for example. Once the VM is running again on the destination server, it will again have access to the full disk bandwidth of a fully functional server.

Next, at the step 824, the SPM 642 may take various other actions, based on the current status and configuration of the virtual computer system 700C and the SAN 22. As described above, the SPM 642 and/or other units within the kernel 600C have access to both VM-specific information and multipath routing information. Having both types of information available gives the SPM 642 and the kernel 600C greater flexibility in controlling the VMs and their access to system resources, and it leads to better decisions regarding which particular actions should be taken, based on the detailed requirements of the entire computer system and the detailed status of both the virtual computer system 700C and the SAN 22. The options of suspending a VM at the step 820 and migrating a VM at the step 822 are two examples of actions that may be taken based on the combination of VM-specific information and multipath routing information. Various other actions are also possible, depending on the particular circumstances of the implementation. As an example of one of the many possible actions that may be taken at the step 824, if a VM is suspended at the step 820, a system alert may be raised to a system administrator or an email notice may be distributed to end-users, informing them that a service provided by an application within the VM has been suspended.

If a decision is made to route the data transfer request at the step 810, then, after the step 818, the method of FIG. 7 proceeds to a step 826. Meanwhile, if a decision is made to queue the data transfer request at the step 810, then, after the step 824, the method of FIG. 7 also proceeds to the step 826. At the step 826, the SPM 642 may decide to route one or more data transfer requests that had previously been queued. The decision whether or not to route queued requests at the step 826 may be substantially the same as the decision at the step 810. The circumstances may have changed, however, since the request was originally queued. For example, the VM requesting the data transfer may no longer be exceeding its allocation for disk bandwidth, or a failback may have occurred since the request was queued, making a path that was previously unavailable due to a SAN failure available now. To determine whether a request should now be routed, based on the current circumstances, the SPM 642 may need to perform one or more of the steps 801, 802, 804, 806 and 808. If a decision is made to route a queued request, the SPM 642 may again perform the steps 812, 816 and 818 in routing the request. Thus, after the SPM 642 performs the method of FIG. 7 to process a new data transfer request, the SPM 642 may effectively perform the same method again, or a subset thereof, to process one or more queued data transfer requests. In particular, however, the step 826 may be performed in an interrupt handler routine after an outstanding data transfer command has completed. In a conventional server network, an interrupt is generated when a data transfer completes, indicating that another data transfer can be initiated. The step 826 may be performed in the interrupt handler routine to determine if a queued data transfer request should now be routed. After the SPM 642 completes the processing of the new data transfer request and possibly one or more queued data transfer requests, the method of FIG. 7 proceeds to a step 828, where the method terminates.

The above description has been given primarily from the perspective of the kernel 600C. However, the benefits of the invention are primarily seen through more efficient and effective execution of the VMs and the applications running thereon. The VMs, however, generally do not see all of this gathering of information, making decisions and taking appropriate actions. Instead, with respect to the SAN, a VM only sees one or more virtualized disks 240B, such as a local SCSI disk attached to a SCSI adapter. The guest OS only needs to interface with this one device in a direct and straightforward manner. However, this simple virtual disk represents the VM's share of a complex, redundant, multipath data storage network. The guest OS reaps the benefits of multipathing, such as a highly available data store, without itself having to do any multipathing. The guest OS doesn't even know that there is a multipath data storage system involved. Instead, the guest OS simply writes data to, and receives data from, the virtualized local disk. All the multipathing is done by the SPM 642 within the kernel 600C. These benefits of multipathing are also provided to each of the other VMs in the virtual computer system 700C, without each VM having to have a SPM. Also, none of the VMs have to adapt to any changes that occur in the SAN 22, such as when an extra path is added. Any changes in the SAN 22 are handled by the SPM 642 within the kernel 600C and are transparent to the VM's. This further enhances the portability of the VMs because they do not have to be customized to the SAN 22 or make any changes due to changes in the SAN 22.

As described above, the invention integrates a storage path manager (SPM) into the kernel of a virtual computer system, which gives the SPM, and/or other units within the kernel, concurrent access to VM-specific information and to multipath routing information. Having access to both of these types of information improves data routing decisions of the SPM, and it improves VM management decisions and system resource sharing decisions of the SPM and other units within the kernel. These same benefits can be derived by various other embodiments of a SPM within a virtual computer system, so long as VM-specific information and multipath routing information are both used to reach data routing decisions, VM management decisions and/or system resource sharing decisions, along with other possible types of decisions. For example, in the virtual computer system described briefly above, in which a VMM is co-resident with a host operating system, so that there is no kernel, the SPM may be integrated into the VMM. In this case, functions of the storage virtualizer, the VM manager, and the resource manager may also be implemented in the VMM. Such an implementation may also lead to some or all of the benefits described above.

What is claimed is:

1. A method for responding to a request to transfer data between a first virtual machine (VM) in a computer system and a virtual storage device backed up by a data storage unit within a multipath data storage system, the method comprising:
   identifying the request issued by the first VM, the request being a virtual data transfer request, the first VM being one of a plurality of VMs;
   identifying a plurality of possible paths over which the data could be routed from the computer system to the data storage system and multipath routing information related to a state of each of the possible paths;
   determining VM-specific information related to the first VM, wherein the VM-specific information indicates a priority of the first VM relative to other VMs of the plurality of VMs;
   selecting one path of the plurality of paths according to an algorithm, which takes as inputs at least contents of the multipath routing information and contents of the VM-specific information; and
   routing a physical data transfer request corresponding to the virtual data transfer request to the data storage system over the one path that was selected.

2. The method of claim 1, further comprising:
   determining whether a failure has occurred that prevents the transfer of data over a first path of the plurality of possible paths;
   failing over to one or more alternate paths when the failure has occurred, deciding whether the first VM should be suspended according to a second algorithm, wherein the second algorithm takes as inputs at least whether the failure has occurred and contents of the VM-specific information, and suspending the first VM when the second algorithm returns a decision to suspend the first VM.

3. The method of claim 2, further comprising not routing the data to the data storage unit.

4. The method of claim 2, wherein the VM-specific information indicates a priority of the first VM relative to other VMs of the plurality of VMs; and the second algorithm results in a decision to suspend the first VM when the first VM is determined to have a lower priority than one or more other VMs of the plurality of VMs and the failure is determined to have occurred.

5. The method of claim 2, wherein the suspending of the first VM includes suspending the first VM until the failure is corrected.

6. The method of claim 2, wherein the suspending of the first VM includes suspending the first VM until a failback occurs.

7. The method of claim 1, further comprising:
   deciding, prior to the routing and according to a second algorithm, whether to immediately route the request or to queue the request, the second algorithm taking as inputs at least contents of the multipath routing information and contents of the VM-specific information, wherein the routing is immediately performed when the deciding results in a decision to immediately route the request.

8. The method of claim 1, wherein the VM-specific information indicates an amount of disk bandwidth that is allocated to the VM.

9. The method of claim 1, wherein the multipath routing information includes a pending data transfer load for each of plurality of possible paths over which data could be routed.

10. The method of claim 9, wherein:
    the VM-specific information includes an identifier of the first VM as the source of the request; and
    the algorithm distributes requests such that substantially all requests received from the first VM are routed over the one path, and substantially all requests from at least another VM of the plurality of VMs are routed over a second path of the plurality of possible paths.

11. The method of claim 1, further comprising:
    determining whether a failure has occurred that prevents the transfer of data over a first path of the plurality of possible paths;
    when the failure has occurred:
      failing over to one or more alternate paths when the failure has occurred;
      deciding whether the first VM should be migrated to a different physical computer according to a second algorithm, which takes as inputs at least contents of the VM-specific information; and
      migrating the first VM when the second algorithm returns a decision to migrate the first VM.

12. A method for responding to a request to transfer data between a first virtual machine (VM) in a computer system and a virtual storage device backed up by a data storage unit within a multipath data storage system, the method comprising:
    identifying the request issued by the first VM, the request being a virtual data transfer request, the first VM being one of a plurality of VMs;
    identifying a plurality of possible paths over which the data could be routed from the computer system to the data storage system and multipath routing information related to each of the possible paths;
    determining whether a failure has occurred that prevents the transfer of data over a first path of the plurality of possible paths;
    determining VM-specific information related to the first VM, the VM-specific information indicating the first VM's priority relative to other virtual machines; and
    when the failure is determined to have occurred, deciding whether the first VM should be migrated to a different physical computer system according to an algorithm, which takes as inputs at least contents of the VM specific information, and migrating the first VM to a different physical computer when the failure has occurred.

13. The method of claim 12, further comprising, when the failure is determined to have occurred, failing over to one or more alternate paths.

14. The method of claim 12, further comprising not routing the data to the data storage unit.

15. The method of claim 12, wherein the first VM is determined to have a lower priority than one or more other virtual machines.

16. A computer readable storage medium embodying a computer program for handling a data transfer request in a computer system, the computer system comprising virtualization software interposed between the interfacing with a plurality of virtual machines (VMs) and system hardware, the computer program being integrated with or coupled to the virtualization software, whereby, when executed on the computer system, the computer program causes the virtualization software to perform a method for handling a data transfer request between a first VM of the plurality of VMs and a virtual device backed up by data storage unit within a multipath data storage system, the method comprising:

identifying the data transfer request issued by a first VM;
identifying a plurality of possible paths over which the data could be routed from the computer system to the data storage system and multipath routing information related to a state of each of the possible paths;
determining VM-specific information related to the first VM, the VM-specific information indicating a priority of the first VM relative to other VMs of the plurality of VMs;
selecting one path of the plurality of paths according to an algorithm, which takes as inputs at least contents of the multipath routing information and contents of the VM-specific information; and
routing a physical data transfer request corresponding to the virtual data transfer request to the data storage system over the one path that was selected.

17. The computer readable storage medium of claim 16, wherein the method further comprises:
determining whether a failure has occurred that prevents the transfer of data over a first path of the plurality of possible paths;
failing over to one or more alternate paths when the failure has occurred;
deciding whether the first VM should be suspended according to a second algorithm, which takes as inputs at least whether the failure has occurred and contents of the VM-specific information; and
suspending the first VM when the second algorithm returns a decision to suspend the first VM.

18. The computer readable storage medium of claim 17, wherein the algorithm results in a decision to suspend the first VM when the first VM is determined to have a lower priority than one or more other VMs of the plurality of VMs and the failure is determined to have occurred.

19. The computer readable storage medium of claim 17, wherein the suspending of the first VM includes suspending the first VM until the failure is corrected.

20. The computer readable storage medium of claim 17, wherein the suspending of the first VM includes suspending the first VM until a failback occurs.

21. The computer readable storage medium of claim 16, wherein the method further includes not routing the data to the storage unit.

22. The computer readable storage medium of claim 16, wherein the method further comprises:
deciding, prior to the routing and according to a second algorithm, whether to immediately route the data transfer request or to queue the data transfer request, the second algorithm taking as inputs at least contents of the multipath routing information and contents of the VM-specific information, wherein the routing is immediately performed when the deciding results in a decision to immediately route the data transfer request.

23. The computer readable storage medium of claim 16, wherein the method further comprises:
determining whether a failure has occurred that prevents the transfer of data over a first path of the plurality of possible paths;
failing over to one or more alternate paths when the failure has occurred;
deciding, according to a second algorithm, whether the first VM should be migrated to a different physical computer system, the second algorithm taking as inputs at least whether the failure has occurred and contents of the VM-specific information; and
migrating the first VM to the different physical computer system when the second algorithm returns a decision to migrate the first VM.

24. The computer readable storage medium of claim 16, wherein the VM-specific information indicates an amount of disk bandwidth that is allocated to the VM.

25. The computer readable storage medium of claim 16, wherein the multipath routing information includes a pending data transfer load for each of plurality of possible paths over which data could be routed.

26. The computer readable storage medium of claim 16, wherein:
the VM-specific information includes an identifier of the first VM as the source of the request; and
the algorithm distributes requests such that substantially all requests received from the first VM are routed over the one path, and substantially all requests from at least another VM of the plurality of VMs are routed over a second path of the plurality of possible paths.

* * * * *